(12) United States Patent
Ara et al.

(10) Patent No.: US 7,706,906 B2
(45) Date of Patent: Apr. 27, 2010

(54) WORK MANAGEMENT SUPPORT METHOD AND WORK MANAGEMENT SUPPORT SYSTEM WHICH USE SENSOR NODES

(75) Inventors: Koji Ara, Cambridge, MA (US); Norihiko Moriwaki, Hachioji (JP); Kazuo Yano, Hino (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/058,894

(22) Filed: Mar. 31, 2008

(65) Prior Publication Data

US 2008/0189157 A1 Aug. 7, 2008

Related U.S. Application Data

(63) Continuation of application No. 11/493,893, filed on Jul. 27, 2006, now Pat. No. 7,366,579.

(30) Foreign Application Priority Data

Oct. 11, 2005 (JP) ............................. 2005-295838

(51) Int. Cl.
*G06F 19/00* (2006.01)
*G08B 23/00* (2006.01)
(52) U.S. Cl. .................................. 700/111; 340/573.1
(58) Field of Classification Search .................. 700/28, 700/108–111, 174; 702/182–185; 340/539.1–539.32, 340/573.1–576
See application file for complete search history.

(56) References Cited

U.S. PATENT DOCUMENTS

| | | | |
|---|---|---|---|
| 4,878,176 A | * | 10/1989 | Teranishi et al. ............ 700/111 |
| 4,884,067 A | * | 11/1989 | Nordholm et al. ........... 340/689 |
| 5,198,800 A | * | 3/1993 | Tozawa et al. ............ 340/573.1 |
| 5,913,201 A | | 6/1999 | Kocur |
| 5,918,226 A | | 6/1999 | Tarumi et al. |
| 6,092,048 A | | 7/2000 | Nakaoka |
| 6,115,640 A | | 9/2000 | Tarumi |
| 6,256,550 B1 | | 7/2001 | Wu et al. |

(Continued)

FOREIGN PATENT DOCUMENTS

JP 2004206484 A * 7/2004

(Continued)

OTHER PUBLICATIONS

IBM-Organization Communication Diagnosis http://www-1.ibm.com/services/jp/index.wss/ofering/bcs/a1011037, Oct. 4, 2005.

(Continued)

*Primary Examiner*—M. N. Von Buhr
(74) *Attorney, Agent, or Firm*—Antonelli, Terry, Stout & Kraus, LLP.

(57) ABSTRACT

A sensor net system including: a sensor node which includes: a sensor which obtains sensor data of a worker; a radio frequency circuit which notifies a server of the sensor data; and a server which includes: a relation list for correlating the sensor data with work status of the worker; a unit for confirming the work status of the worker based on the obtained sensor data by using the relation list; a unit for displaying the confirmed work status on a display unit connected to the server.

10 Claims, 28 Drawing Sheets

U.S. PATENT DOCUMENTS

| | | | |
|---|---|---|---|
| 6,345,207 B1 * | 2/2002 | Nitta et al. | 700/83 |
| 6,714,913 B2 | 3/2004 | Brandt et al. | |
| 6,856,852 B1 * | 2/2005 | Bruinsma et al. | 700/177 |
| 7,034,677 B2 * | 4/2006 | Steinthal et al. | 340/539.12 |
| 7,151,972 B2 | 12/2006 | Denton et al. | |
| 7,257,513 B2 * | 8/2007 | Lilly | 702/182 |
| 7,412,264 B2 * | 8/2008 | Swallow | 455/567 |
| 2003/0139955 A1 | 7/2003 | Kirli et al. | |
| 2003/0191681 A1 | 10/2003 | Gallion et al. | |
| 2004/0093351 A1 | 5/2004 | Lee et al. | |
| 2004/0225397 A1 * | 11/2004 | Gotfried | 700/111 |
| 2004/0267595 A1 | 12/2004 | Woodings et al. | |
| 2005/0125275 A1 | 6/2005 | Wright et al. | |
| 2006/0200264 A1 | 9/2006 | Kodama et al. | |
| 2006/0212570 A1 * | 9/2006 | Aritsuka et al. | 709/224 |
| 2007/0241901 A1 * | 10/2007 | Cage et al. | 340/572.1 |
| 2008/0285734 A1 * | 11/2008 | Ehlinger et al. | 379/201.07 |

FOREIGN PATENT DOCUMENTS

| | | | |
|---|---|---|---|
| JP | 2004355317 A | * | 12/2004 |
| JP | 2006201866 A | * | 8/2006 |

OTHER PUBLICATIONS

Sokwoo Rhee, et al., Artifact-resistant Power-Efficient Design of Finger-Ring Plethysmographic Sensors, IEEE Transactions on Biomedical Engineering, vol. 48, No. 7, Jul. 2001, pp. 795-805.

* cited by examiner

FIG. 1
MANAGEMENT SUPPORT SYSTEM USING A SENSOR NET
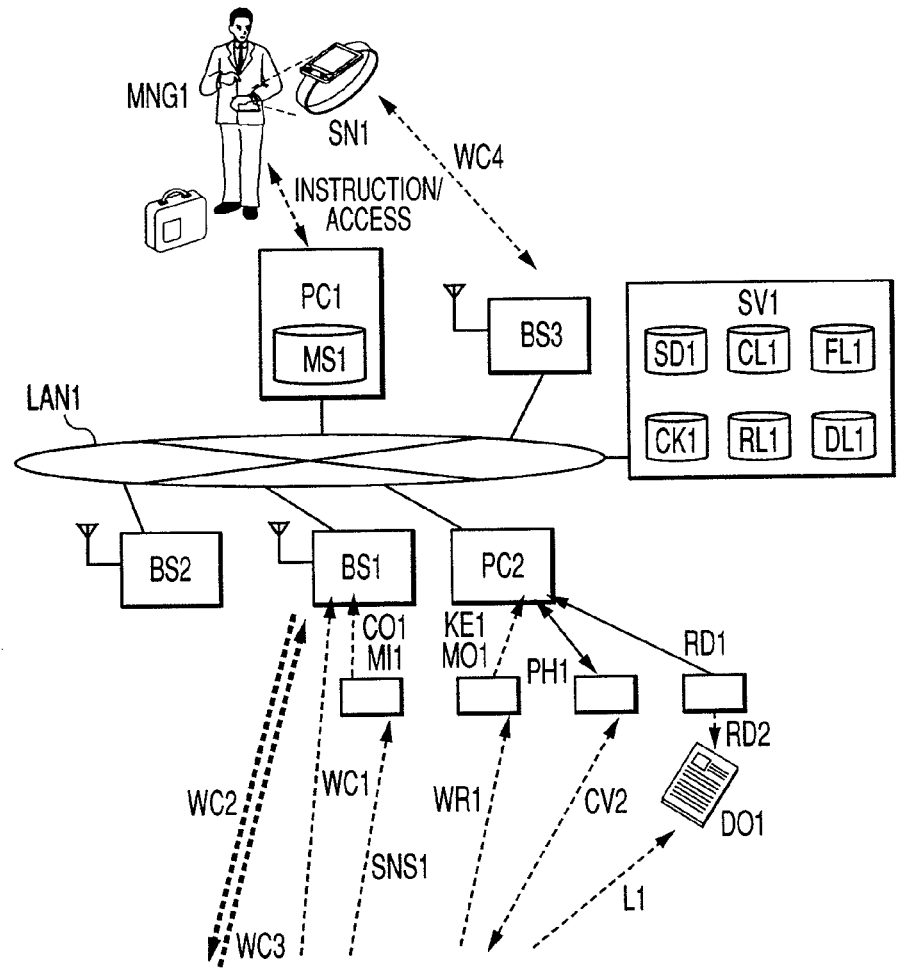
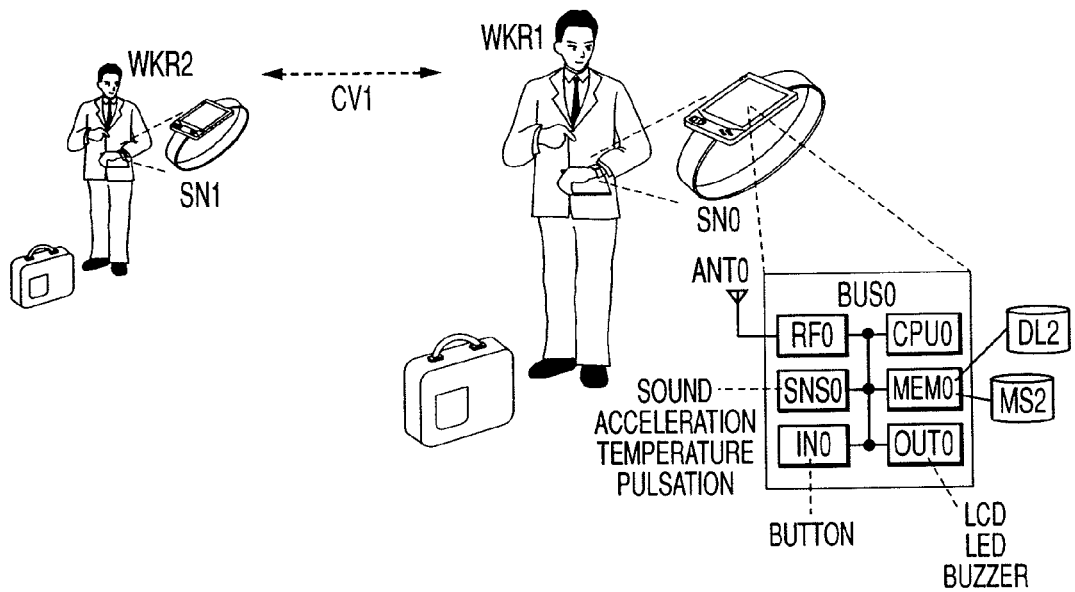

FIG. 2

COMMITMENT LIST

CL1

| | RW | RI | RP | RA | RST | RD | RH | RHT | RPH | RS |
|---|---|---|---|---|---|---|---|---|---|---|
| | WKR1 | W1 | NONE | W2 | 8/13 | 8/23 | 0 | 0 | NOT STARTED | |
| | | W2 | W1 | W3 | 8/5 | 8/25 | 1 | 1 | DEFINITION | NEW |
| | | W3 | W2 | W3 | 8/1 | 8/31 | 0 | 0 | NOT STARTED | |
| | | W4 | NONE | NONE | 8/1 | 8/31 | 0 | 3 | NEGOTIATION | UP |
| | WKR2 | W1 | W1 | W2 | 8/5 | 8/25 | 1 | 4 | EXECUTION | |
| | | W2 | NONE | W2 | 8/3 | 8/23 | 0 | 0 | NOT STARTED | UP |
| | WKR3 | W1 | NONE | W2 | 8/2 | 8/23 | 1 | 4 | EVALUATION | D |

FIG. 3

RELATION LIST

RL1

RL11

| RI | RC | RK |
|---|---|---|
| W1 | WKR2 | ZigBee |
| W2 | WKR3 | WRISTBAND NODE, COMPANY Y |
| W3 | NONE | NAME TAG NODE, TRADE SHOW U |
| W4 | NONE | HUMAN DYNAMICS |

RL12

| RC | RT | RM | RR | RNN | RCN |
|---|---|---|---|---|---|
| WKR2 | 03-xxxx-xxxx | b@b.com | ROOM B | 123B | 567B |
| WKR3 | 03-xxxx-xxxx | c@b.com | ROOM C | 123C | 567C |
| WKR4 | 03-xxxx-xxxx | d@b.com | ROOM D | 123D | 567D |

WORK SELECTION SCREEN

MANAGEMENT SUPPORT SYSTEM USING A SENSOR NET EXTRACTING A KEYWORD

WRISTBAND NODE SCREEN
CHANGING THE CURRENT WORK

MANAGEMENT SUPPORT SYSTEM USING A SENSOR NET
PRIORITIZATION

WRISTBAND NODE SCREEN
LISTING WORKERS RELATED TO THE CURRENT WORK

WRISTBAND NODE SCREEN
LISTING WORKERS RELATED TO A KEYWORD

WRISTBAND NODE SCREEN
NOTIFICATION OF RELATED INFORMATION

MANAGEMENT SUPPORT SYSTEM USING A SENSOR NET UPDATING AN INTEREST LIST AUTOMATICALLY

MANAGEMENT SUPPORT SYSTEM USING A SENSOR NET CONSOLIDATION AS A CONSOLIDATED LIST

FIG. 17

CONSOLIDATED LIST

| RI | RC | RM | RD | RW | RH | RHT | RPH |
|----|----|----|------|-----|---|----|-------------|
| W1 | C1 | P1 | 8/23 | ABC |   |    |             |
| W2 | C1 | P1 | 8/25 | AB  | 0 | 4  | NOT STARTED |
| W3 | C1 | P1 | 8/31 | A   | 0 | 6  | NOT STARTED |
| W4 | C2 | P2 | 8/31 | A   | 0 | 20 | NOT STARTED |

SL1

MANAGEMENT SUPPORT SYSTEM USING A SENSOR NET
ENTERING COMMITMENT LIST DATA BY E-MAIL

MANAGEMENT SUPPORT SYSTEM USING A SENSOR NET ENTERING COMMITMENT LIST DATA BY E-MAIL

FIG. 22

FINISHING SCHEDULE LIST AND STARTING SCHEDULE LIST

FL1

| RW | RI | RP | RA | RD | RH | RHT | RPH | RS |
|---|---|---|---|---|---|---|---|---|
| WKR1 | W1 | NONE | W2 | 8/23 | 0 | 0 | EXECUTION | |
| WKR2 | W2 | W1 | W3 | 8/23 | 1 | 1 | DEFINITION | NEW |
| WKR3 | W3 | W2 | W3 | 8/24 | 0 | 1 | EXECUTION | |
| WKR1 | W4 | NONE | NONE | 8/24 | 0 | 3 | EXECUTION | UP |
| WKR2 | W1 | W1 | W2 | 8/25 | 1 | 4 | EXECUTION | |
| WKR3 | W2 | NONE | W2 | 8/25 | 0 | 3 | FINISHED | UP |
| WKR3 | W1 | NONE | W2 | 8/25 | 1 | 4 | EVALUATION | D |

SL1

| RW | RI | RP | RA | RST | RH | RHT | RPH | RS |
|---|---|---|---|---|---|---|---|---|
| WKR1 | W5 | NONE | NONE | 8/23 | 0 | 0 | NOT STARTED | |
| WKR2 | W6 | W1 | W9 | 8/23 | 0 | 0 | DEFINITION | NEW |
| WKR3 | W7 | W2 | W10 | 8/24 | 0 | 0 | NOT STARTED | |
| WKR1 | W8 | NONE | NONE | 8/25 | 0 | 0 | NEGOTIATION | UP |
| WKR2 | W9 | W6 | W12 | 8/25 | 0 | 0 | PROPOSAL | |
| WKR3 | W10 | W7 | W13 | 8/25 | 0 | 0 | NOT STARTED | UP |
| WKR3 | W11 | NONE | W14 | 8/25 | 0 | 0 | NOT STARTED | D |

MANAGEMENT SUPPORT SYSTEM USING A SENSOR NET

MANAGEMENT SUPPORT SYSTEM USING A SENSOR NET

MANAGEMENT SUPPORT SYSTEM USING A SENSOR NET

MANAGEMENT SUPPORT SYSTEM USING A SENSOR NET

MANAGEMENT SUPPORT SYSTEM USING A SENSOR NET

MANAGEMENT SUPPORT SYSTEM USING A SENSOR NET

WORK MANAGEMENT SUPPORT METHOD AND WORK MANAGEMENT SUPPORT SYSTEM WHICH USE SENSOR NODES

CROSS REFERENCE TO RELATED APPLICATION

This is a continuation of U.S. application Ser. No. 11/493,893, filed Jul. 27, 2006 now U.S. Pat. No. 7,366,579. This application relates to and claims priority from Japanese Patent Application No. 2005-295838, filed on Oct. 11, 2005. The entirety of the contents and subject matter of all of the above is incorporated herein by reference.

FIELD OF THE INVENTION

The present invention relates to a method which uses electronic circuitry with a wireless communication function to stimulate business communications and strengthen cooperation among workers.

BACKGROUND OF THE INVENTION

With the recent innovations of information technology as exemplified by the Internet, e-mails, and inexpensive long distance calls, firms' decision making processes seem to be in transition from top-down approaches to decentralization of decision making authority. Now that the sort of information that only senior executives involved in management could access in the past can be instantly accessed by any employee, it becomes indispensable in competition with other companies that workers at worksites make decisions by themselves as promptly as possible. In this connection, it is important that workers cooperate in a flexible manner to reach an optimum solution in the possible shortest time.

Methods of supporting decision making processes include BSC (Balance Score Card) and the commitment list method. The BSC method emphasizes considerations in the aspects of finance, customer, process, and growth. When a decision is made paying attention to balancing among these aspects, a biased judgment can be avoided. In addition, when quantifiable data such as sales and the number of customers are used as indicators for evaluation (metrics) as far as possible, achievements can be made visible.

The commitment list method is a method of expressing business goals in written form. Specifically, commitment lists include descriptions of goals and undertakings as agreed at meetings or by discussions; and tasks, employees in charge, deadline, dependence on other tasks, conditions, and achievement criteria are written there. These lists should tell who is committed to achieving what kind of goals and how the current situation is. Therefore, information on items and conditions should be updated periodically and accessible.

Also, a method of strengthening cooperation among workers, has been proposed in which e-mails among workers are grasped and analyzed and their interrelations and frequencies are visualized in the form of graphs or the like for use as a reference material for making decisions on organizational change (IBM, "Organizational Communication Diagnosis" http://www-1.ibm.com/services/jp/index.wss/offering/bcs/a10 11037, searched on Oct. 4, 2005). Concretely, which department plays a key role in communications, or conversely which department is responsible for communication trouble are found and the findings may be used as indicators.

In recent years, a network system which uses sensors with a small electric circuit having a wireless communication function to input various types of information from the real world into data processors in real time (hereinafter called a "sensor net") has been under consideration. Such sensor nets have a wide range of potential applications; one example is a medical application in which patient conditions such as pulsation are constantly monitored using a finger-ring type miniature electronic circuit which integrates a wireless circuit, a processor, a sensor and a battery and a monitoring result is transmitted to a diagnostic device through wireless communications so that a health condition can be checked based on the monitoring result (Sokwoo Rhee et al. "Artifact-Resistant Power-Efficient Design of Finger-Ring Plethysmographic Sensors," IEEE Transactions On Biomedical Engineering, Vol. 48, No. 7, Jul. 2001, pp. 795-805).

SUMMARY OF THE INVENTION

On the other hand, the former methods, BSC and the commitment list method, do not ensure real-time data communications though they are useful in indicating the manager's policy or knowing how workers. These methods have a general tendency that since BSC or commitment list data is corrected, checked and transmitted manually, it takes time to update the data and the data is updated only weekly or monthly. As a consequence, even if a work problem occurs, it cannot be detected immediately and a prompt remedial action cannot be taken. Also, if a problem occurs inside an organization, or when there is some change in an external environment and the manager revises the organizational policy or goal, a delay may occur in notifying the workers of the revision and thus waste of labor may result.

Furthermore, regarding cooperation among workers, analysis of e-mails in the former methods only reveals how frequently a worker accesses another worker. What may be important to strengthen cooperation among workers is that workers responsible for similar tasks cooperate or workers skilled in a specific field cooperate with workers interested in the field.

In order to achieve this, the following problems must be solved. First, the manager and workers must be able to exchange information interactively in as much real-time as possible. Therefore, the first problem is that the manager should be able to know in real time what work the workers are doing at their worksites. Particularly it is desirable that the manager can know which worker is engaged in which work category listed in the commitment list and how much.

The second problem is that the manager should be able to communicate his/her policy to workers or give them an instruction about priorities of tasks in as much real time as possible.

On the other hand, cooperation among workers must be strengthened. Concretely, or as the third problem, it is important that, while a worker is at work (for example, he/she is in a meeting or drawing up a document or on the phone), he/she can know in real time which worker is involved in a related task and can access the worker immediately.

As the fourth problem, it may be important that a worker associated with the work (meeting, phone conversation or the like) can be notified in real time that a task related to the work is being performed.

The present invention provides the following solutions to the above problems.

The solution to the first problem is to use data as a sensing result, a commitment list and a relation list which defines the relation between the sensing result data and commitment list items so that work categories in which workers are engaged and working hours are automatically detected and detection results are automatically reflected in the commitment list. For each worker, this system can detect a fact that a worker stays in close proximity to another worker, sense sound or voice through a microphone, extract a keyword from a document produced or accessed on a PC, and enable a worker to explicitly specify a work category using a sensor node.

As for the second problem, the invention offers a solution as follows: when a manager gives an instruction about priorities or the order of priority to a commitment list, a relevant worker and a relevant work category are identified according to the commitment list and a priority instruction is sent to the sensor node which the worker wears and displayed on the LCD of the sensor node as a display device.

As for the third problem, the invention offers a solution as follows. A work category in which each worker is engaged, a keyword and working hours are recorded in a commitment list and a relation list, and each worker enters a keyword in an interest list according to his/her interest. Then, the behavior of a first worker is monitored through a microphone or by extracting a keyword from a document produced or accessed on a PC and also an explicit specification of a work category through a sensor node is received. From this, a work category or relevant keyword is extracted. After that, a second worker related to the extracted work category or keyword is searched from the commitment lists, relation lists and interest lists as mentioned above. If there is a worker which is related to it, information on the second worker is sent to the sensor node which the first worker wears. At the same time, the current location of the first worker is detected by a base station installed in each room or a sensor installed on the chair of each worker and the current location information is shown on a nearby display device, namely a monitor in each room or each worker's PC.

As a solution to the fourth problem, the sensor node of the second worker detected in the process described in connection with the third problem shows that work relevant to his/her work is underway.

The present invention promotes communications between a manager and workers, thereby enabling decision making at the worker level. In such a decision making process and a subsequent implementation process, it is possible to maximize cooperation among workers while paying utmost attention to the manager's intention.

If cooperation among workers is strengthened in this way, a better decision can be made in a shorter time. In addition, a more suitable worker for a specific work category can be accessed without intermediation of the manager.

BRIEF DESCRIPTION OF THE DRAWINGS

The invention will be more particularly described with reference to the accompanying drawings, in which:

FIG. 1 shows a management support system according to an embodiment of the present invention;

FIG. 2 shows a commitment list according to an embodiment of the invention;

FIG. 3 shows a relation list according to an embodiment of the invention;

FIG. 17 shows a consolidated list as a result of consolidation in FIG. 16 according to an embodiment of the invention;

FIG. 22 shows a commitment list display form according to an embodiment of the invention;

DETAILED DESCRIPTION OF THE PREFERRED EMBODIMENTS

Figure 4:
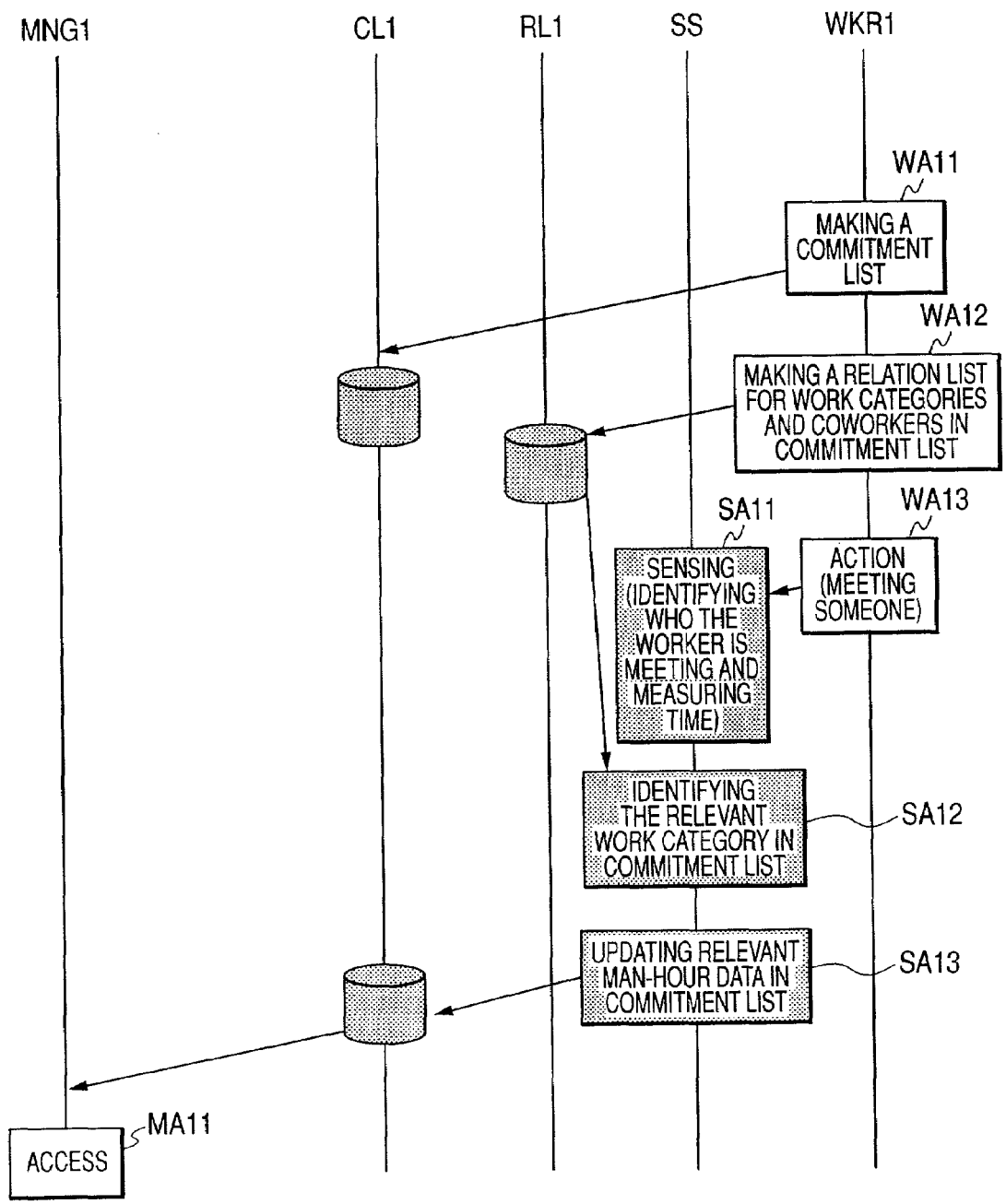
FIG. 4 shows a flow in which cooperation with another worker is sensed and the sensing result is reflected in a commitment list.

Next, preferred embodiments of the present invention will be described in detail referring to the accompanying drawings. Like elements are designated by like reference numerals.

FIG. 1 shows a basic system configuration according to the invention. A worker WRK1 holds a sensor node SN0 which is mounted on a wristband or name tag. The sensor node SN0 is composed of a processor circuit CPU0, a radio frequency circuit RF0, a sensor SNS0 for sound, acceleration, temperature or pulsation, a memory MEM0 for storing a management support program MS2, a button IN0, and an output device OUT0 such as an LCD, LED or buzzer. The information sensed by the sensor node SN0 and the information given by the sensor node SN0 are sent respectively through wireless communication WC1 and wireless communication WC3 to a base station device BS1 or BS2. On the other hand, a work priority instruction or work-related information is sent through wireless communication WC2 from the base station device BS1 to the sensor node SN0. The information which the base station BS1 has received is stored in a server SV1 through a wired network LAN1. The server SV1 stores not only sensor data SD1 but also a commitment list CL1, an interest list CK1 and a relation list RL1 which will be explained later. It also stores a list containing search conditions FL1 and a list DL1 containing display items which will be described later. Also, on the wired network LAN1, a computer PC1 on which a manager MNG1 makes an access or gives an instruction (MA1) is connected. PC1 stores a management support program MS1. A computer PC2 which is used by a worker is also connected on the wired network LAN1. PC2 is connected with: a keyboard KE1 and a mouse MO1 which are used to make a document or commitment list (WR1), an IP phone PH1 for conversation (CV2), and a barcode/IC tag reader RD1 for reading a barcoded or tagged medium DO1 (RD2) which is visually checked by a worker (L1). PC1 may be connected with similar input and output devices.

The base station BS1 is connected with a camera CO1 and a microphone MI1 so that conversation with another worker WKR2 (CV1) is sensed by the microphone MI1 (SNS1). Alternatively, each sensor node SN0 may incorporate a microphone.

Hereinafter, all the pieces of hardware described above and software programs which run on them, namely the sensor node SN0 and the base station BS1, various sensors, server SV1 and PCs which are connected on the wired network LAN1, and a management support system which runs on them are collectively called the sensor net system SS.

FIG. 2 shows an example of a commitment list according to this embodiment. In this embodiment, it is assumed that there are three workers A, B, and C as indicated in row RW. The worker WRK1 is in charge of four work categories W1 to W4 as indicated in row RI. Likewise, the worker B is responsible for two work categories W1 and W2 and the worker C is responsible only for work W1. In each line of this list, items related to each work category are written. For example, row RP is used for a presupposed item; row RA for an item which will have an influence later; row RST for a scheduled date of start; and row RD for deadline. These items are defined by the manager or workers in advance and entries are made for them. In addition, the number of man-hours for which the relevant worker has been engaged in the relevant work in a given period (for example, a week) is written in row RH, and a total of such man-hours is written in row RHT (these two types of data are updated by analysis of sensor data as needed). The current phase in each work category is written in row RPH. For example, the process of each work category includes the following phases: "not started" to "definition" to "proposal" to "negotiation" to "agreement" to "execution" to "reporting" to "evaluation" to "acceptance or refusal" to "finished." Row RS contains status information about the relevant work (current situation or change). For example, such status information may concern an update, delay or new listing.

FIG. 3 shows a list (relation list RL1) concerning the commitment list CL1 and various work categories. The relation list RL1 is referred to when sensor data of a worker is to be analyzed to know which work the worker is doing. The tables shown in FIG. 3 define the work categories which the worker WRK1 is supposed to be engaged in. Regarding the four work categories W1 to W4, the first table in FIG. 3, RL11, shows keywords associated with other workers who work together with the worker WRK1 and relevant work categories. For example, in the first line of the table RL11 of FIG. 3, the work category W1 is defined as follows. In this case, a keyword "WKR2" in row RC is interpreted to mean that when the worker WKR1 is working with the worker WKR2, they are doing work W1. Similarly, when a keyword in the row RK is detected, it is interpreted to be connected with work W1. Also, detailed information on the coworker defined in the first table RL11 is entered in the second table RL12. In the second table, telephone number is entered in row RT; mail address in row RM; location is entered in row RR; the identification number of the name tag or wristband of the relevant coworker is entered in row RNN; and the identification number of the seat node where the worker is seated is entered in row RCN.

FIG. 4 shows an embodiment of the present invention. First, the worker WKR1 makes a commitment list CL1 for the server SV1 (WA11). The commitment list CL1 is as shown in FIG. 2. Then, the worker WKR1 makes a relation list RL1 which defines the relation between work categories indicated in the commitment list CL1 and the work which the worker is going to do (WA12). These steps should be taken before work is started actually. Then, work is started actually (WA13). Here, let's say that the worker WKR works with the worker WKR2. In this case, the sensor net system SS first searches for another worker working near the worker WKR1 (SA11). Whether workers are working together nearby can be confirmed, for example, by identifying the base station with which the node SN0 of the worker WKR1 is communicating and looking for another worker who is communicating with the same base station. Let's say that it has been thus confirmed that the worker WKR2 is working near, and together with, the worker WKR1. Next, the sensor net system SS decides which work category in the commitment list corresponds to the work which the workers are doing (SA12). Concretely, it checks the relation list RL1 to see whether or not the coworker is registered there. In this case, it checks the relation list for the worker WKR1 as shown in FIG. 3 and confirms that the work which he/she is doing together with the coworker WKR2 is work W1. At the same time, the sensor net system SS measures the time for which the workers WKR1 and WKR2 have worked together. After that, it updates the data on actually measured man-hours in a corresponding line of the rows RH and RHT of the commitment list CL1 (SA13). The corresponding line is identified based on the relevant worker name (code) and relation list data. In this case, since work W1 for the worker WKR1 is relevant, the corresponding line is the first line in the table of FIG. 2. The commitment list CL1 is thus updated automatically and accessed by the manager (MA11).

Figure 5:
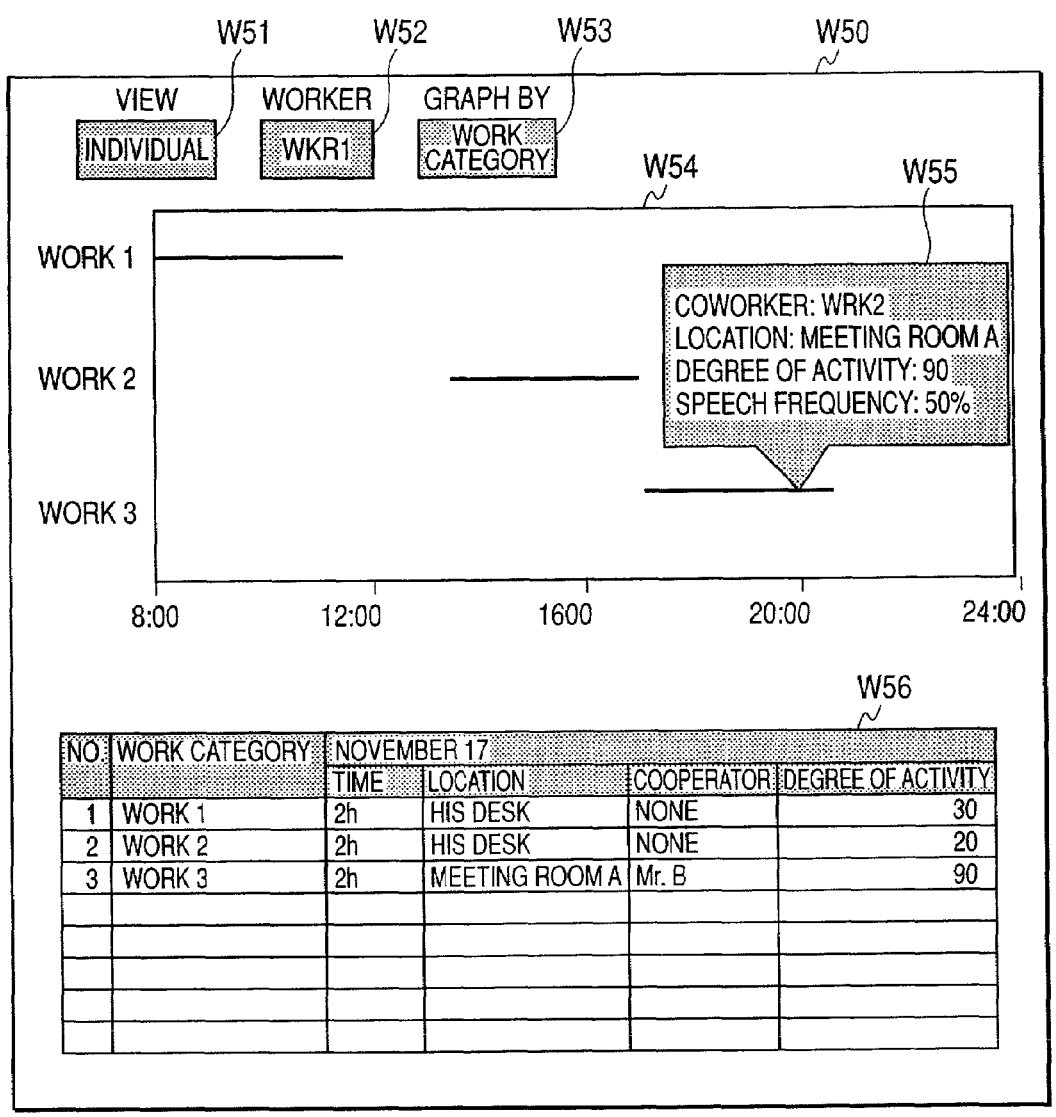
FIG. 5 shows how a commitment list is displayed according to an embodiment of the invention.

FIG. 5 shows a screen which is accessed by the manager MNG1 according to an embodiment of the invention. In this figure, W50 represents a window which appears on a PC. W51 represents a pull-down box to select whether to access individual workers or a team. W52 represents a pull-down box to select which worker to be accessed. In the case of the commitment list shown in FIG. 2, three workers WKR1, WKR2 and WKR3 are selectable. W53 represents a pull-down box where it is possible to select whether data is graphically shown as sorted by work category, worker or location. FIG. 5 shows data sorted by work category. W54 represents a result display area. Work categories which the worker WKR1 was engaged in on a day are graphically shown in chronological order. W55 represents a related information display field which shows information obtained through the sensor when the worker WKR1 was engaged in a relevant work category. Let's say that the sensing result reveals that the coworker with whom the worker WKR1 was engaged in work 3 was the worker WKR2 and they worked in meeting room A. When each seat in meeting room A is equipped with a microphone, it may be possible to detect through the microphones what percentage of time in a given time zone was spent on discussion and know which person (person in which seat) spoke. Let's say that 90 percent of time in the time zone was spent on discussion and the worker WKR1 spoke with a speech frequency of 50%. W55 in FIG. 5 shows how this information is presented. In W56, the same information as the graphically presented information in W54 is presented in tabular form.

Figure 6:
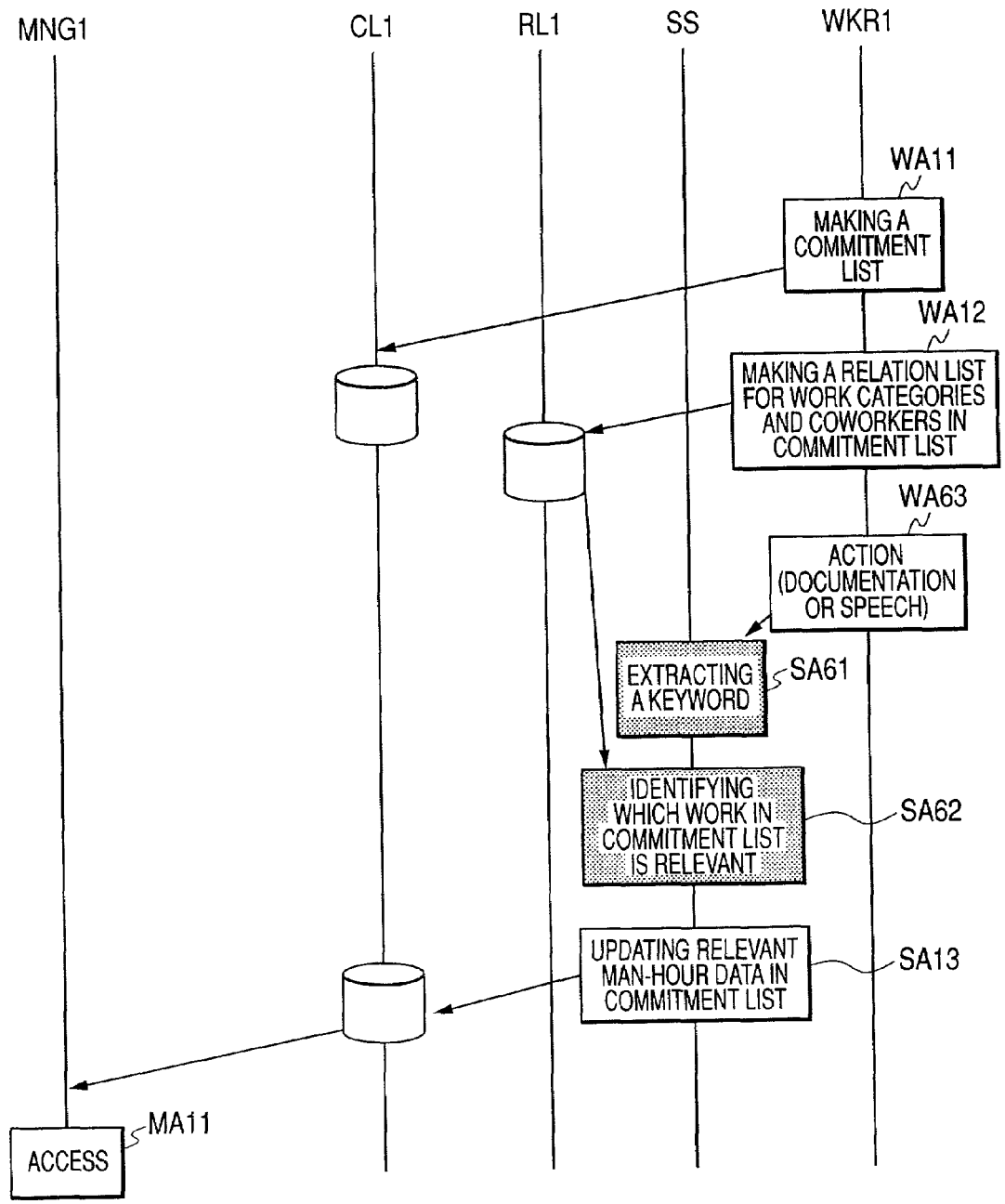
FIG. 6 shows a flow in which a keyword is extracted from a document produced on a PC or a conversation and reflected in a commitment list.

FIG. 6 shows a variation of the embodiment shown in FIG. 4 where the work in which the worker is engaged is determined from a document being produced or conversation. Here, a commitment list CL1 and a relation list RL1 are made in the same way as in the case of FIG. 4. What should be done next is actual work (WA63). Let's say that the task is to make a document such as a report or e-mail. In this case, the sensor net system SS first extracts a keyword from the document being produced or accessed on the PC in use by the worker WKR1 (SA61). Then, the sensor net system SS detects which work category in the commitment list corresponds to the work in which the worker is currently engaged. Concretely, it checks the relation list to see whether the keyword is written there. In this case, it checks the relation list (FIG. 3) for the worker WKR1 and confirms that the keyword, for example, "wristband node" corresponds to work W2.

At the same time, the sensor net system SS measures the time for which the worker WKR1 worked to make and edit the document. After that, it updates the data on actually measured man-hours in the corresponding line of the rows RH and RHT of the commitment list CL1 (SA63). The commitment list CL1 thus updated automatically can be accessed by the manager (MA11). Even in the case of conversation, the process is similar: the conversation is sensed through microphones, voice analysis is made to extract a keyword, and the work category which corresponds to the keyword is found.

Figure 7:
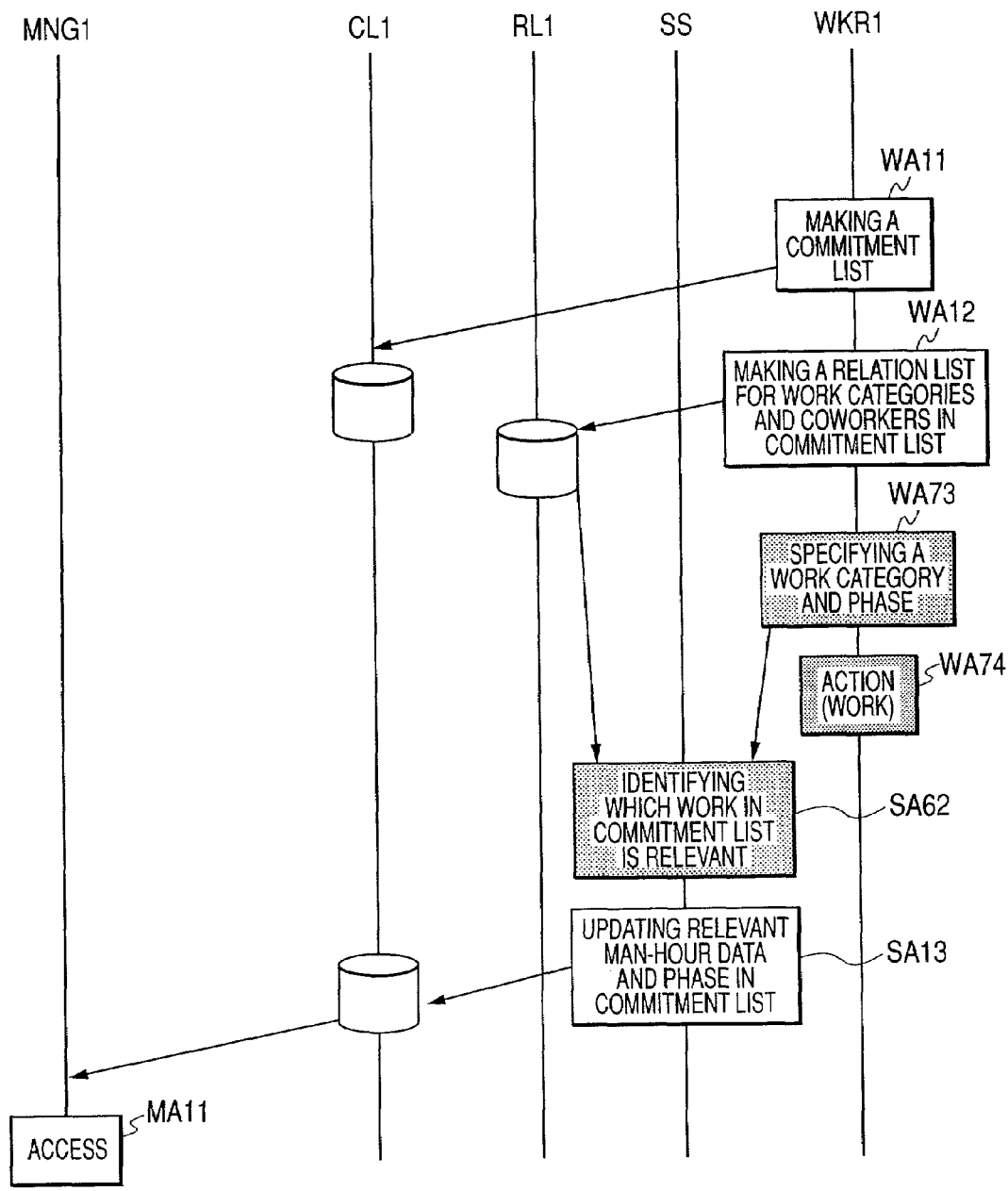
FIG. 7 shows a flow in which a work category is explicitly specified by the use of a sensor node and this information is reflected in a commitment list.

FIG. 7 shows another variation of the embodiment shown in FIG. 4 where the worker explicitly specifies the work which he/she is going to do. Here, a commitment list CL1 and a relation list RL1 are made in the same way as in the case of FIG. 4. What should be done next is actual work (WA74). In this case, prior to actual work, the worker selects a work category (WA73). The selection process is exemplified in FIG. 8. The steps to be taken after the selection are the same as in the flow shown in FIG. 4.

In another embodiment, RFID or a barcode showing keyword information or work ID information is added to a document which the worker reads or a machine which the worker uses and prior to actual work, it is read to specify the work which the worker is going to do.

Figure 8:
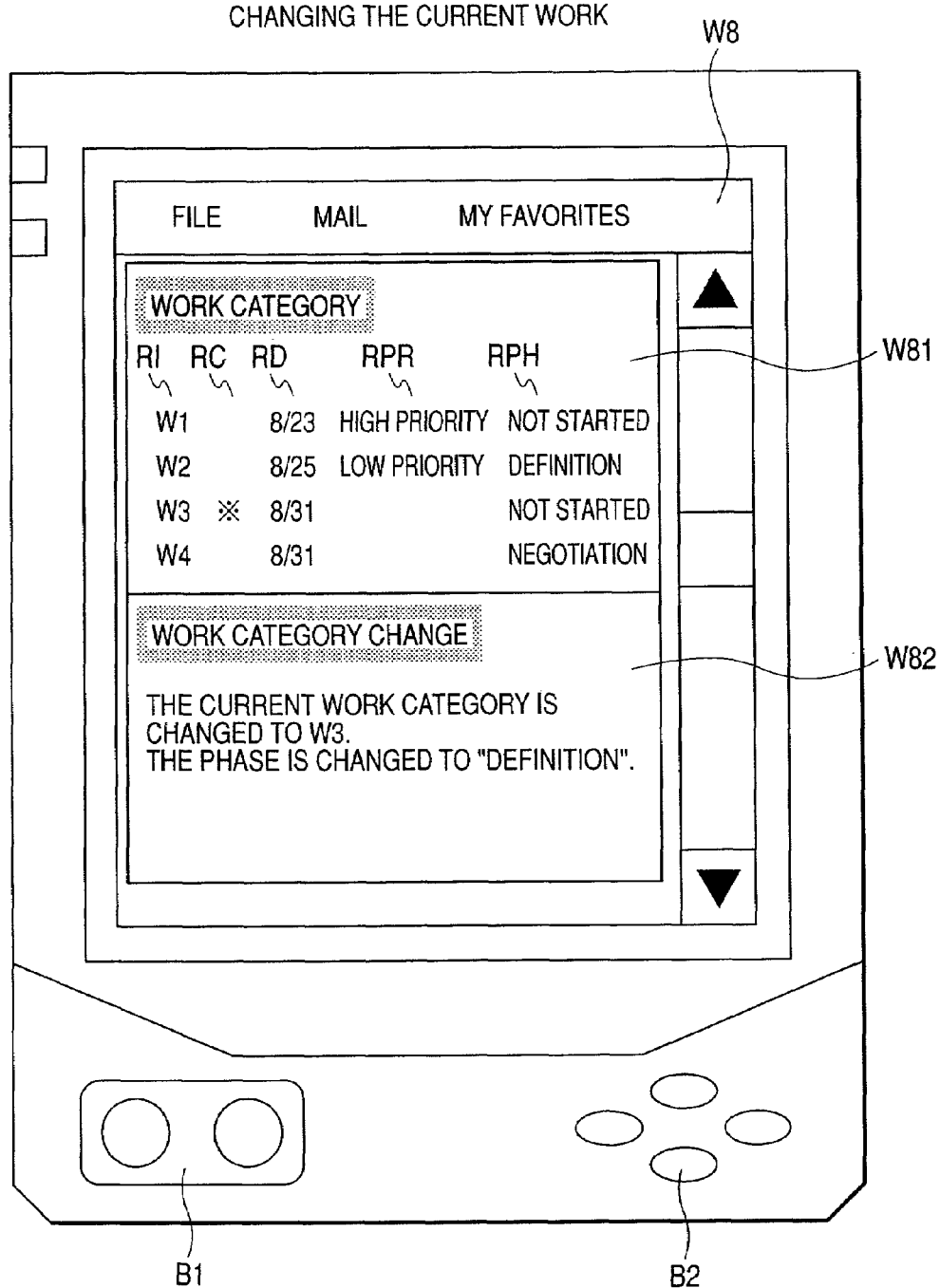
FIG. 8 shows a sensor node screen on which a worker specifies a work category in which he/she will be engaged.

FIG. 8 shows a sensor node screen on which the worker selects the work which he/she is going to do and how to operate. SN0 represents a wristband sensor node which the worker wears. It has a display screen W8, an OK button B1 to accept or cancel, and a shift button B2 to move the cursor on the screen. The display screen W8 includes a work category selection window W81 and a message window W82. The work category selection window W81 shows information on the person wearing this node from the commitment list shown in FIG. 2 which has been sent from the base station BS1 wirelessly. Here, it includes rows concerning a work category, deadline (RD) and the phase of the work category (RPH). It also includes a row RPR indicating priority (which will be described later). Furthermore, it includes a row RC showing the work category in which the worker is currently engaged, where the current work is marked. If the worker is going to change the work, he/she first moves the cursor to the row RC in the window W81 and pushes the OK button B1. This makes the mark movable. Next, the worker moves the mark up or down using the shift button B2, aligns it to the line of the work which he/she is going to do next and pushes the OK button B1. The next work category is selected in this way. The window W82 shows a message which depends on the selection made here. The input data is sent to the server by wireless communication WC1.

Figure 9:
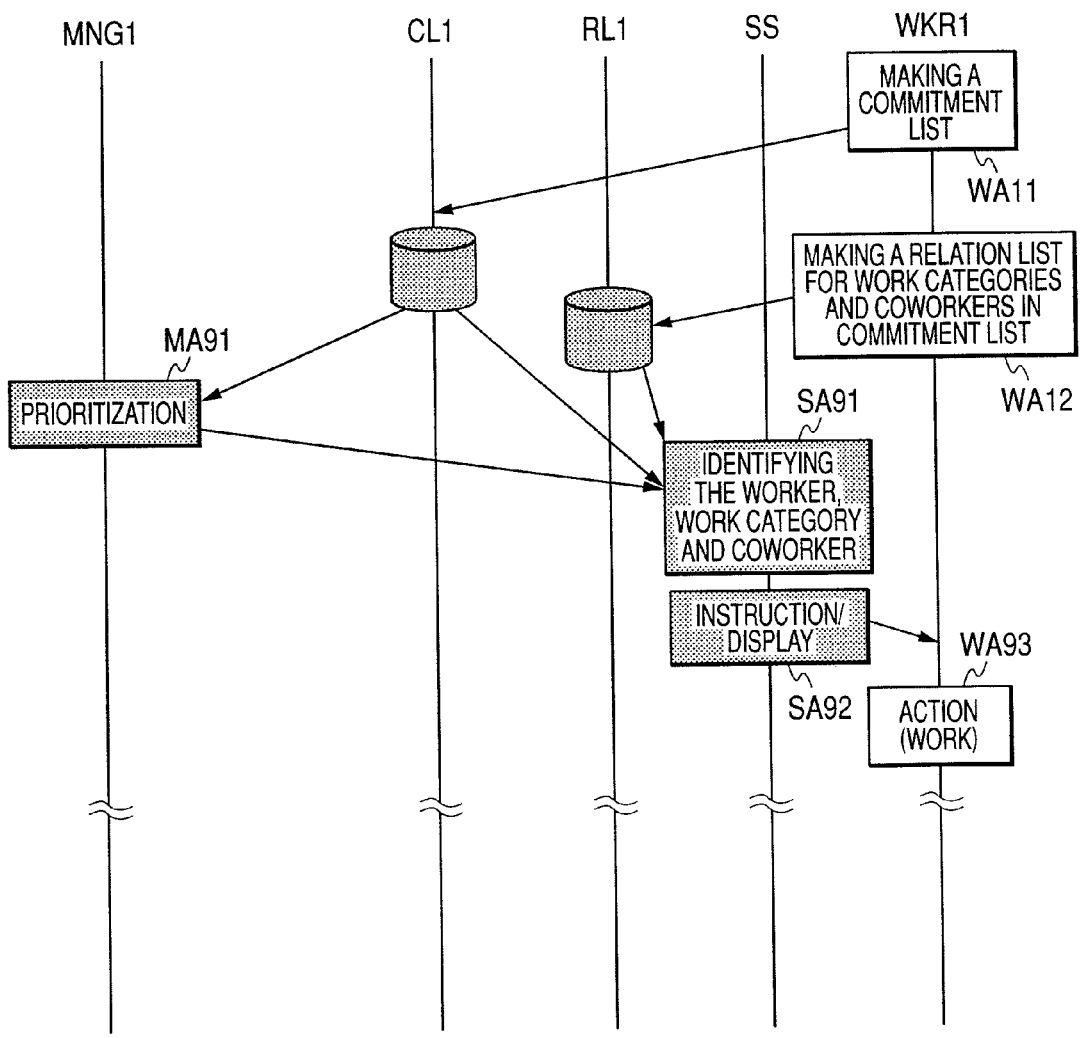
FIG. 9 shows a flow in which according to a priority instruction for work categories indicated in a commitment list a relevant worker is identified and the instruction is sent to the worker and displayed.

FIG. 9 shows a method of propagating the manager's policy in a timely manner based on the process shown in FIG. 4 where the manager specifies priorities. Here, the worker WKR1 makes a commitment list CL1 and a relation list RL1 in the same way as in the case of FIG. 4. What should be done next is actual work (WA93). In this case, prior to actual work, the manager MNG1 accesses the commitment list CL1 (MA91) and specifies priorities or the order of priority of various work categories. For example, the manager sets a flag for the work to be prioritized or numbers the work categories in the order of priority. If the manager has done so, the sensor net system SS finds the worker corresponding to the high priority work and sends a message notifying that his/her work has a high priority, to his/her sensor node SN0. The sensor node SN0 which has received the message identifies the work which has a high priority and shows on its screen that the work has a priority. For instance, as in the case of FIG. 9, the screen may include the row RPR indicating priorities or the order of priority.

Figure 10:
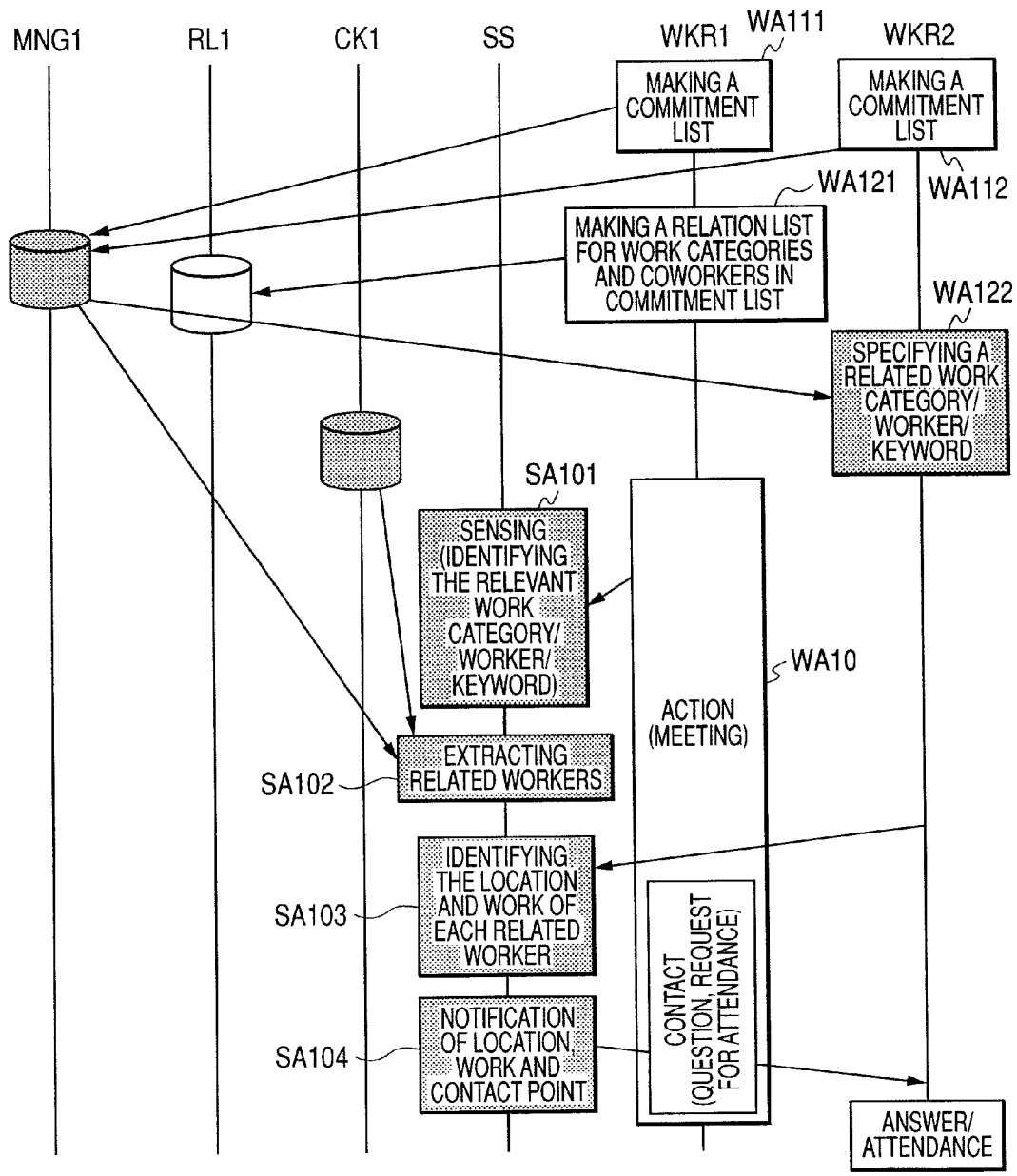
FIG. 10 shows a flow in which a second worker related to a first worker's current work is extracted based on commitment lists, relation lists and interest lists containing keywords, and information on the second worker is displayed on the first worker's sensor node.

FIG. 10 shows a method of deepening cooperation among workers as another embodiment of the present invention. First, in FIG. 10, an example of support by the worker WKR2 is illustrated. The worker WKR1 first makes a commitment list CL1 and a relation list RL1 in the same way as in the case of FIG. 4. Similarly the worker WKR2 makes a commitment list CL1 and enters the content of his/her work in the commitment list. The worker WKR2 also enters keywords for related workers or matters or workers or matters of his/her interest in an interest list CK1. What the worker WKR1 should do next is action (WA10). Let's say that the action is a meeting.

Figure 11:
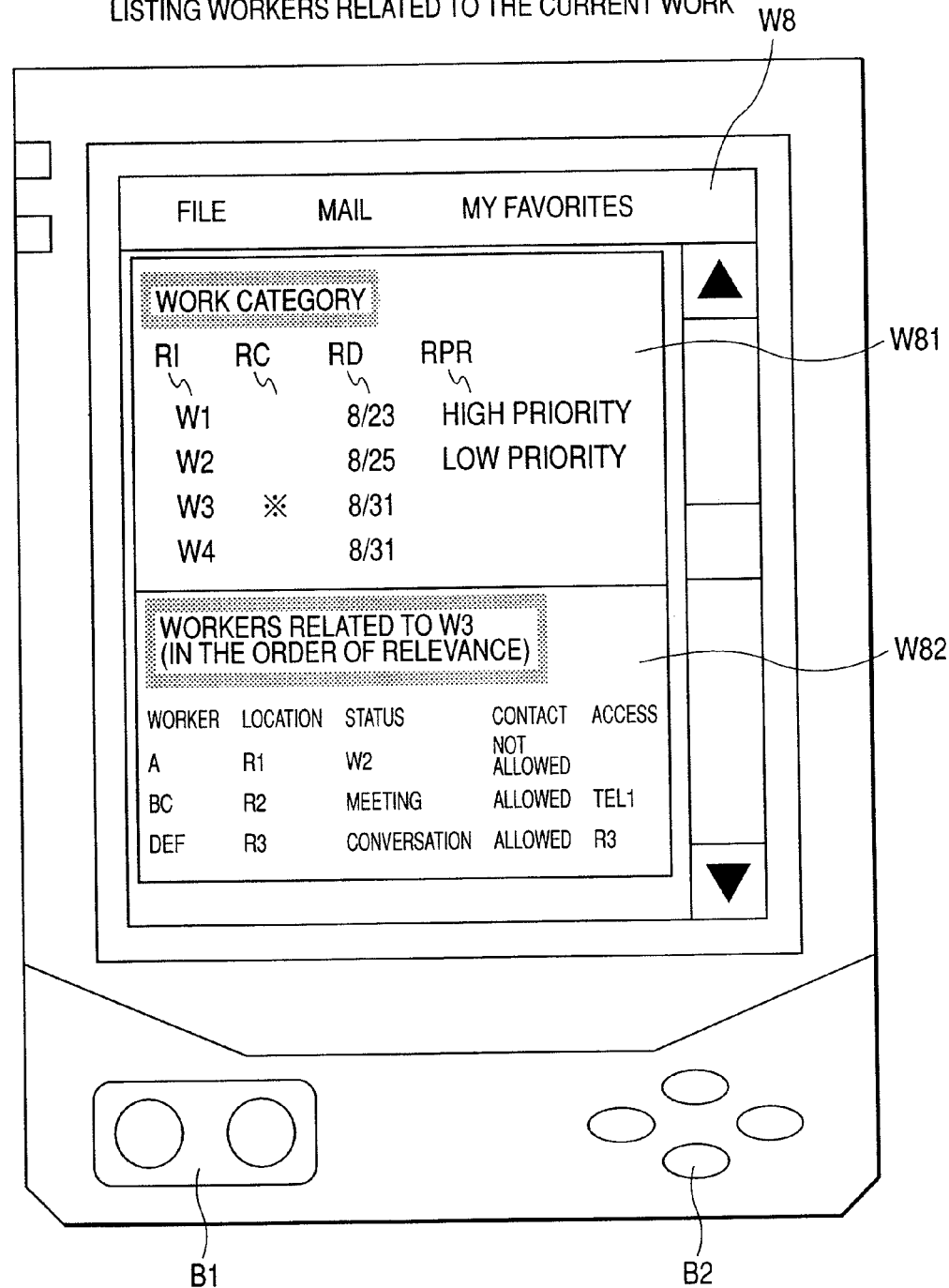
FIG. 11 shows a display screen of the sensor node of the first worker shown in FIG. 10 according to an embodiment of the invention.

In this case, the sensor net system SS senses action WA10 (SA101) and extracts a keyword from the conversation underway there or a document produced on the PC (particularly in the case of a meeting, a presentation material or minutes). When it has successfully identified a keyword, the sensor net system SS refers to the commitment list CL1, relation list RL1 and interest list CK1 and picks up a person who is closely related to the keyword or interested in the keyword. Concretely, the system checks the keyword row RK in the relation list RL1 of FIG. 3 to see whether the keyword is written there. It also makes reference to the interest list CK1 and checks whether the keyword is listed there. The system investigates the location, point of contact and current work of the worker associated with the keyword (SA103). Concretely, the location is confirmed by identifying the base station with which the node SN0 of the worker is communicating. For the point of contact, the mail address and phone number of the worker is picked up from the relation list. For the current work, the work category in which the worker is currently engaged is picked up using the process shown in FIG. 4 or the like. Lastly, information on the current location, point of contact and current work of each such worker is sent through a base station to the sensor node SN0 of the worker WKR1 or the PC in the room where the worker WKR1 stays (SA104). The device which has received such information displays a message according to the information. An example of the display is shown in FIG. 11. When the above steps have been taken, the worker WKR1 can know who is closely related to the current work and what kind of work that person is now engaged in and where.

When several workers related to the current work are successfully picked up, the workers may be listed in the order of relevance in order to increase convenience for those who will receive the information. For instance, if a relation list includes a relevant keyword, the system checks the number of manhours RHT for the relevant work category in the corresponding line of the relevant commitment list CL1. From this, it is possible to know how many hours the worker has been engaged in the work related to the keyword. The numbers of hours which various workers have spent on the work are compared. Since a worker who has spent a longer time may be considered to be related to the work more closely, a higher priority is given to the worker in the displayed list.

If a worker's relation list and interest list includes the keyword, a coworker who is working with that worker may have some kind of information related to the keyword. Therefore, when related workers are listed, it is desirable to list coworkers who are working with them as well. Concretely, the row RC for coworkers in the relation list RL1 is checked to identify a coworker and a corresponding commitment list CL1 is checked to find the collaborating time spent with the coworker. Such coworkers are listed in the descending order of collaborating time.

FIG. 11 shows a screen which lists persons related to the work category in which a worker is engaged as shown in FIG. 10. Let's say that the worker WKR1 now wears the device as illustrated in FIG. 11 and is engaged in work W3. The sensor net system picks up persons closely related to work W3 using the process shown in FIG. 10 and sends the information to the sensor node SN of the worker WKR1. In the message window W82 of the node which received it, related workers are listed in the order of relevance. When an interface is available to specify, before these workers starts working, whether or not they allow another person to contact them during the current work or what kind of means may be used to contact them (for example, telephone, mail, meeting in person), such information can also be displayed at the same time. For example, as the interface, a sensor node SN or PC may be used to specify whether or not contact with a worker is allowed or specify how to access. Instead of the above method in which these matters are determined before start of work, a possible alternative approach is that a commitment list CL1 includes a row which specifies whether to allow contact with a worker and a row which specifies how to access and the information in these rows is displayed unless otherwise specified.

If the sensor node of the worker WKR1 is communicating with the base station in the meeting room A and the worker WKR1 is assumed to stay in the meeting room A, the same information may appear on a PC or projector screen in the meeting room A.

If it is found from the sensor built in the worker WKR1's chair that the worker WKR1 is seated on the chair and the worker WKR1's PC is in use, the same information may appear on the screen of the worker WKR1's PC.

Figure 12:
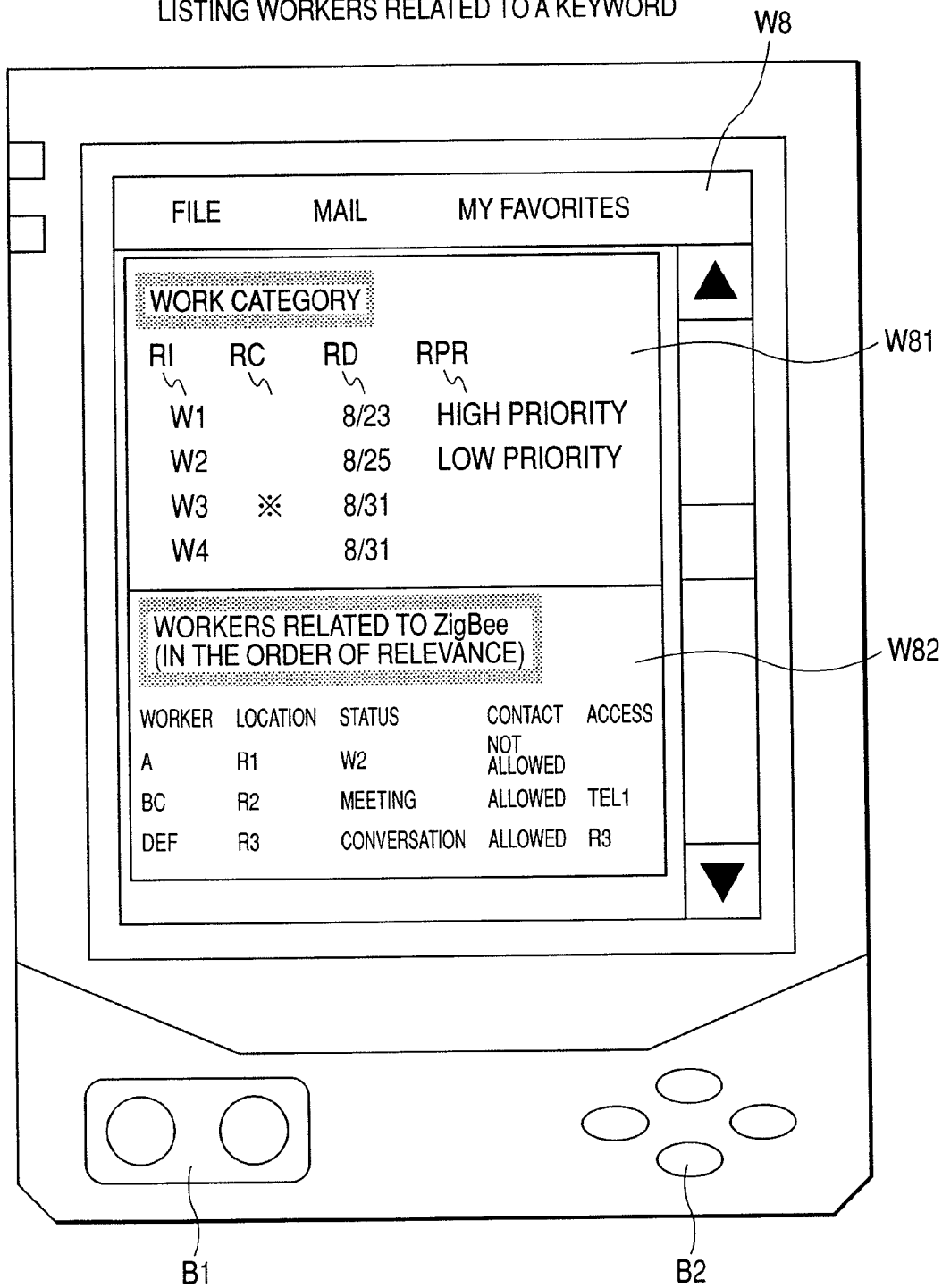
FIG. 12 shows a display screen of the sensor node of the first worker shown in FIG. 10 according to an embodiment of the invention.

FIG. 12 shows an embodiment which is different from the one shown in FIG. 11, where a keyword related to the work in which a worker is engaged is picked up and workers related to the keyword are listed. As in the case of FIG. 11, related workers are listed in the order of relevance in the message window W82.

Figure 13:
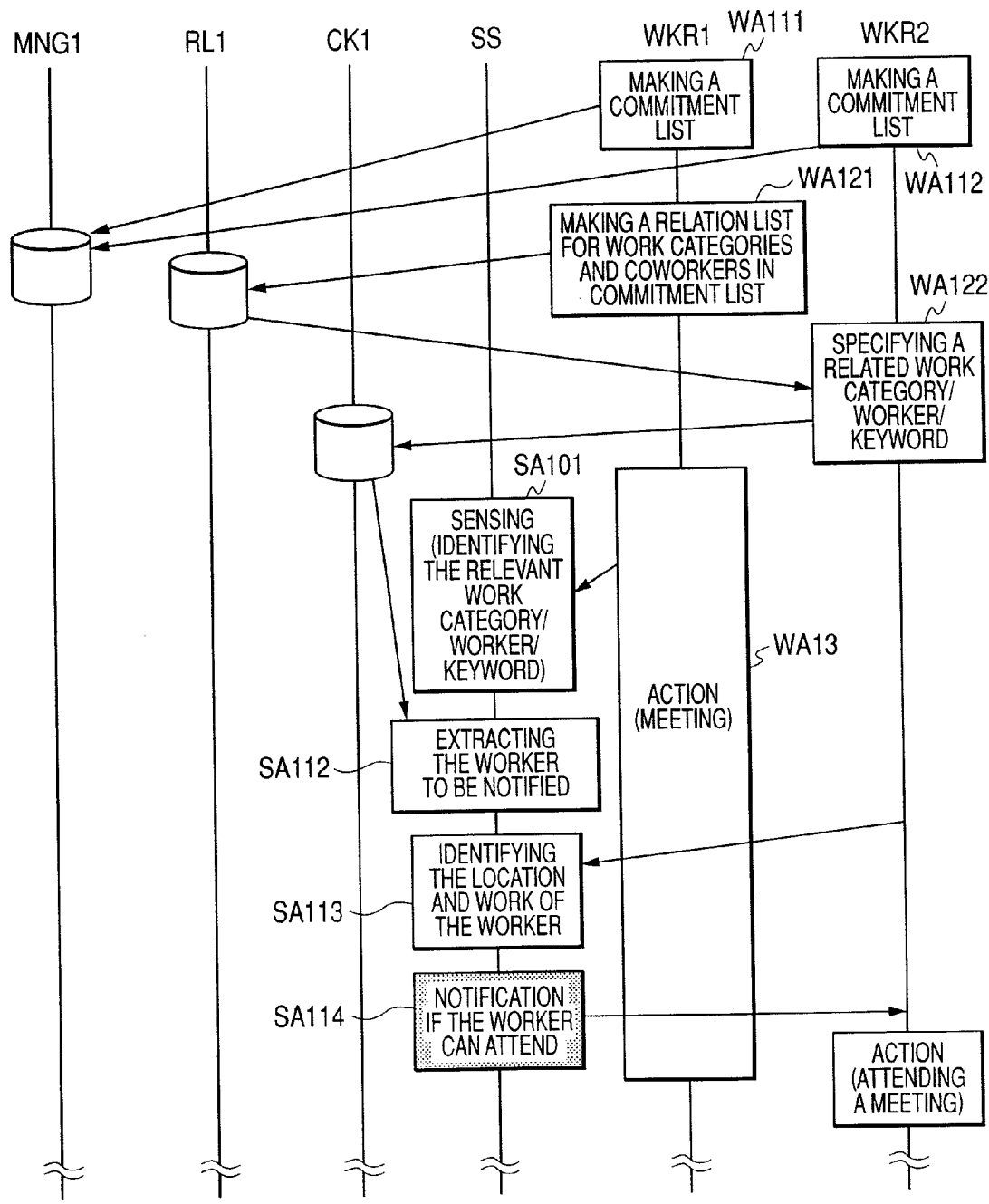
FIG. 13 shows a flow in which a second worker related to a first worker's current work is extracted based on commitment lists, relation lists and interest lists containing keywords, and information on the first worker is displayed on the second worker's sensor node according to an embodiment of the invention.
Figure 14:
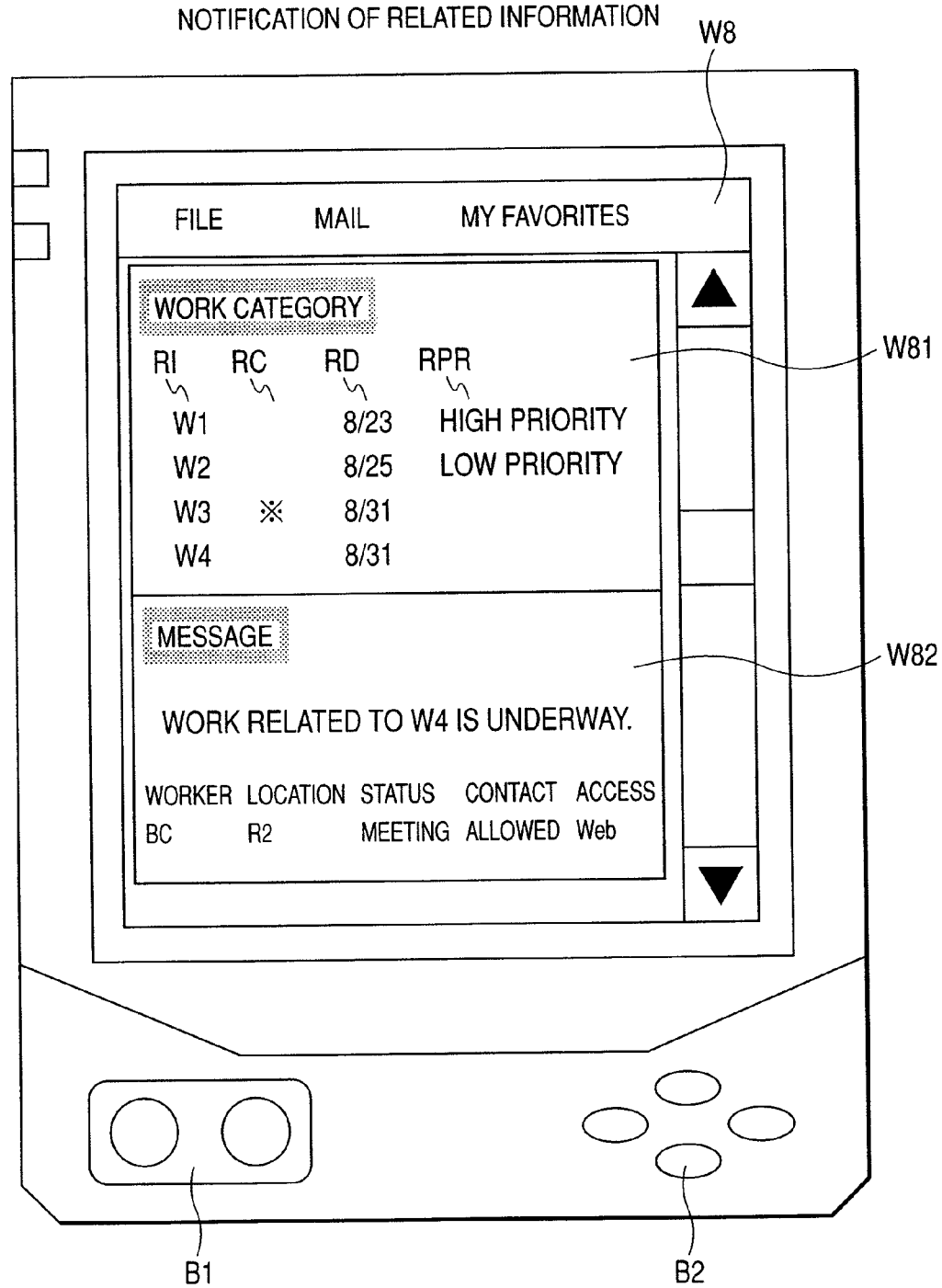
FIG. 14 shows a display screen of the sensor node of the second worker shown in FIG. 13 according to an embodiment of the invention.

FIGS. 13 and 14 concern notification of related work which is another important thing in deepening cooperation among workers. When it is detected through the process shown in FIG. 10 that the worker WKR1 is in a meeting, workers who are likely to be interested in the meeting is notified according to the flow shown in FIG. 13. First the worker WKR1 makes a commitment list CL1 and a relation list RL1 in the same way as in the case of FIG. 10. Similarly the worker WKR2 makes a commitment list CL1 and an interest list CK1. What the worker WKR1 should do next is action (WA13). Let's say that the action is a meeting.

In this case, the sensor net system SS senses action WA13 (SA101) and extracts a keyword from the conversation underway there or a document produced on the PC (particularly in the case of a meeting, a presentation material or minutes). Then, the sensor net system SS searches to see whether the extracted keyword is included in an interest list (SA112). If the keyword exists, for example, in the worker WKR2's interest list, the location and current work of the worker WKR2 are identified (SA113) and the worker WKR2 is notified that the meeting is underway (SA114). Concretely a notification is transmitted to the sensor node of the worker WKR2 and its screen shows the notification as illustrated in FIG. 14 (which will be described later).

In this case, it is also possible that the location of the worker WKR2 is identified from the base station with which the sensor node of the worker WKR2 is communicating, the work category in which the worker WKR2 is currently engaged is detected through the process shown in FIG. 4 and whether or not the worker WKR2 should be notified is determined depending on the detection result. If the worker WKR2 is in a meeting room or conversing with another person, the notification is not transmitted because it might interrupt his/her current work.

FIG. 14 exemplifies how the data which the sensor net system SS has transmitted according to the flow shown in FIG. 13 appears on the screen of the sensor node of the worker WKR2. As in the case of FIG. 11, the message window W82 indicates that related work is underway and shows which worker is engaged in it, and the worker's location and status and how to access the worker.

Figure 15:
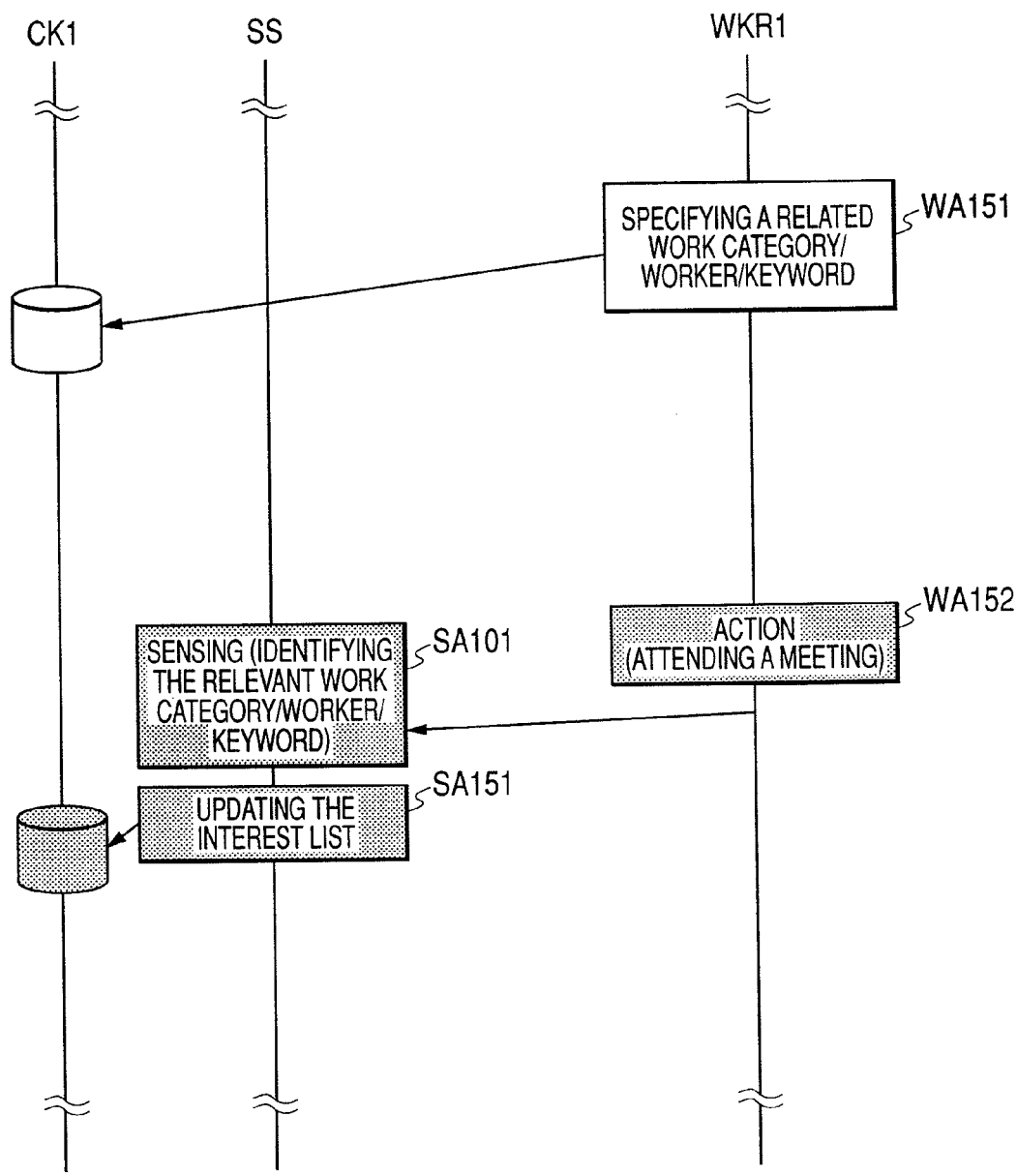
FIG. 15 shows a flow in which an interest list is updated by sensing a worker at work according to an embodiment of the invention.

FIG. 15 illustrates how an interest list as shown in FIG. 10, etc. is automatically updated. After a worker makes an interest list (WA151), if a keyword related to the worker is extracted, it can be automatically entered in the interest list (SA151). In this case, it is also possible to arrange that a threshold for the number of times of keyword appearance is preset and only when the number of times of appearance of a keyword exceeds the threshold, the keyword is added to the interest list. If that is the case, keywords which are not so relevant are not entered in the interest list.

Figure 16:
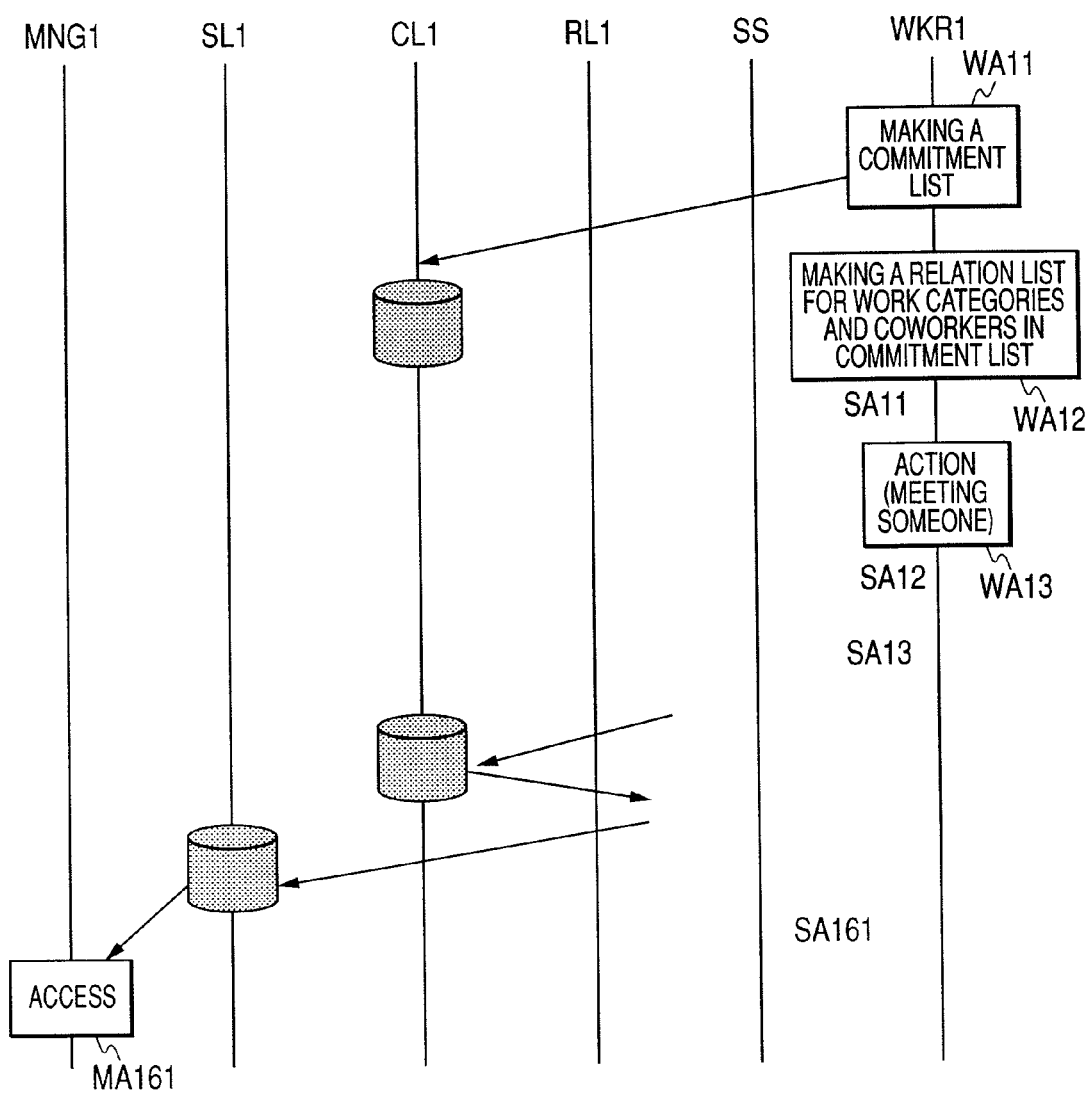
FIG. 16 shows a flow in which commitment lists are consolidated and a consolidated list is displayed according to an embodiment of the invention.

FIG. 16 shows another embodiment concerning access to a commitment list in the flow shown in FIG. 4. When a commitment list CL1 is updated in the same way as shown in FIG. 4, at the same time the sensor net system SS sorts and consolidates all data in commitment lists of individual workers on the basis of work category or the like (SA161) and stores the data as a consolidated list SL1. This method is convenient for the manager because he/she can know not only the working situation of each individual worker but also get the whole picture of each work category simply by accessing such consolidated lists.

In this case, if relevant customer and relevant cost center (budget code) information is previously entered in each line of the commitment list shown in FIG. 2, it can be shown or data can be consolidated on a relevant customer or cost center basis. FIG. 17 shows an example of a list which indicates relevant customers and cost centers.

Figure 18:
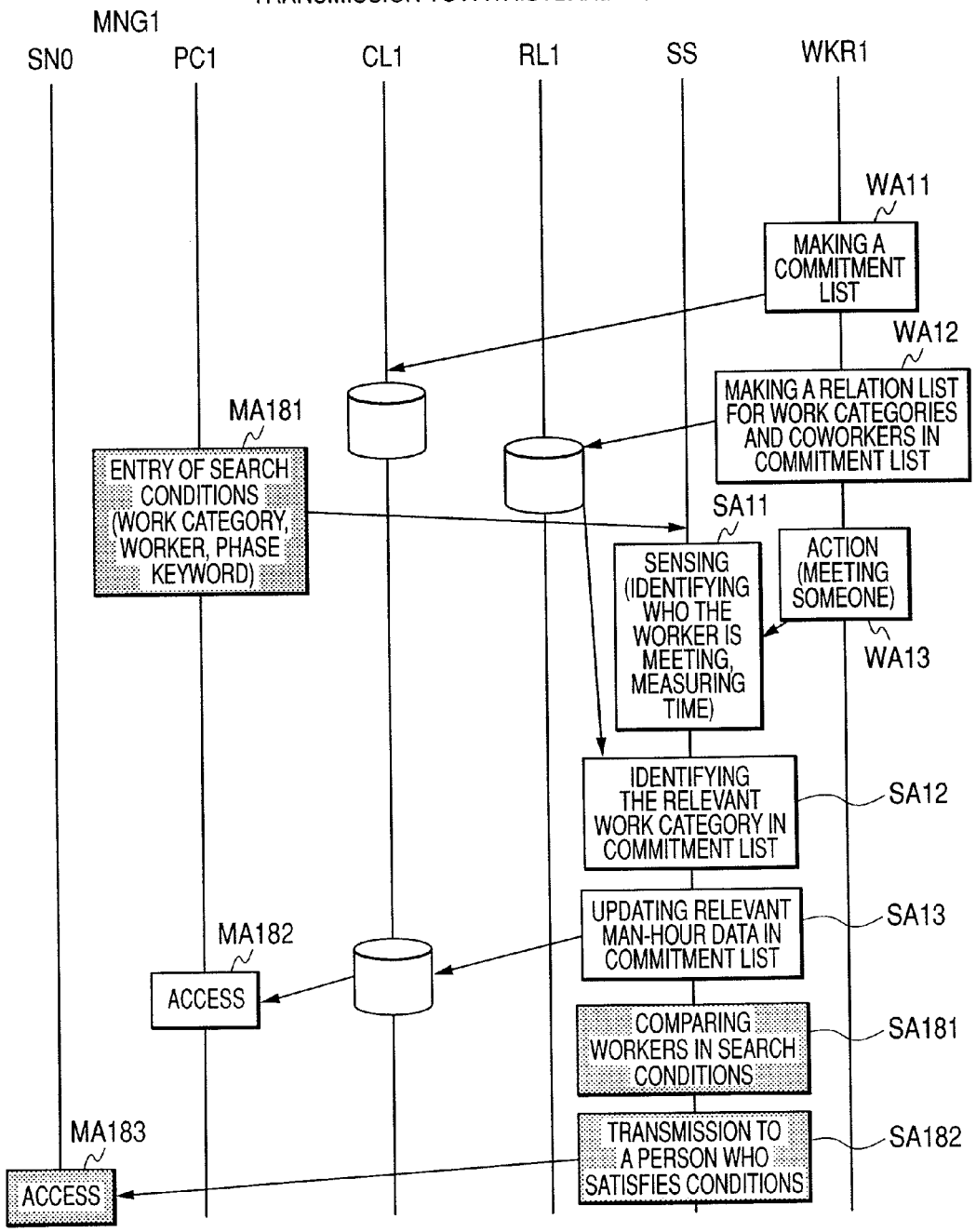
FIG. 18 shows a flow in which search conditions for commitment lists are specified on a PC and when a commitment list is updated based on sensing result data, comparison is made in search conditions and, if the conditions are satisfied, the result is transmitted to a relevant sensor node and displayed there, according to an embodiment of the invention.

FIG. 18 shows an example of a combination of a PC and a sensor node in the system shown in FIG. 4 or a similar system. The worker WKR1 makes a commitment list CL1 and a relation list RL1 in the same way as in the case of FIG. 4. Then the manager MNG1 specifies the work category, worker, phase and keyword to be monitored, as search conditions (MA181). Let's say that the manager enters the following conditional expression: (worker WKR1 and Definition) or (worker WKR1 and W2). In this case, the manager should be able to monitor the worker WKR1 when the worker is in the phase of definition or engaged in work W2. Then, when the worker WKR1 actually enters into the definition phase, the sensor net system SS decides whether the situation complies with the conditional expression. If it complies with the conditional expression, a notice of such compliance is transmitted to the sensor node SN0 of the manager and displayed on its screen as shown in FIG. 19 (which will be described later).

Consequently the manager can obtain information in real time without accessing the PC. It is not adequate to transmit all work information to a sensor node because the sensor node does not have enough electric capacity to deal with such communication and display and its display screen is not large enough to display it. The search function can be used to transmit and display only important information.

Figure 19:
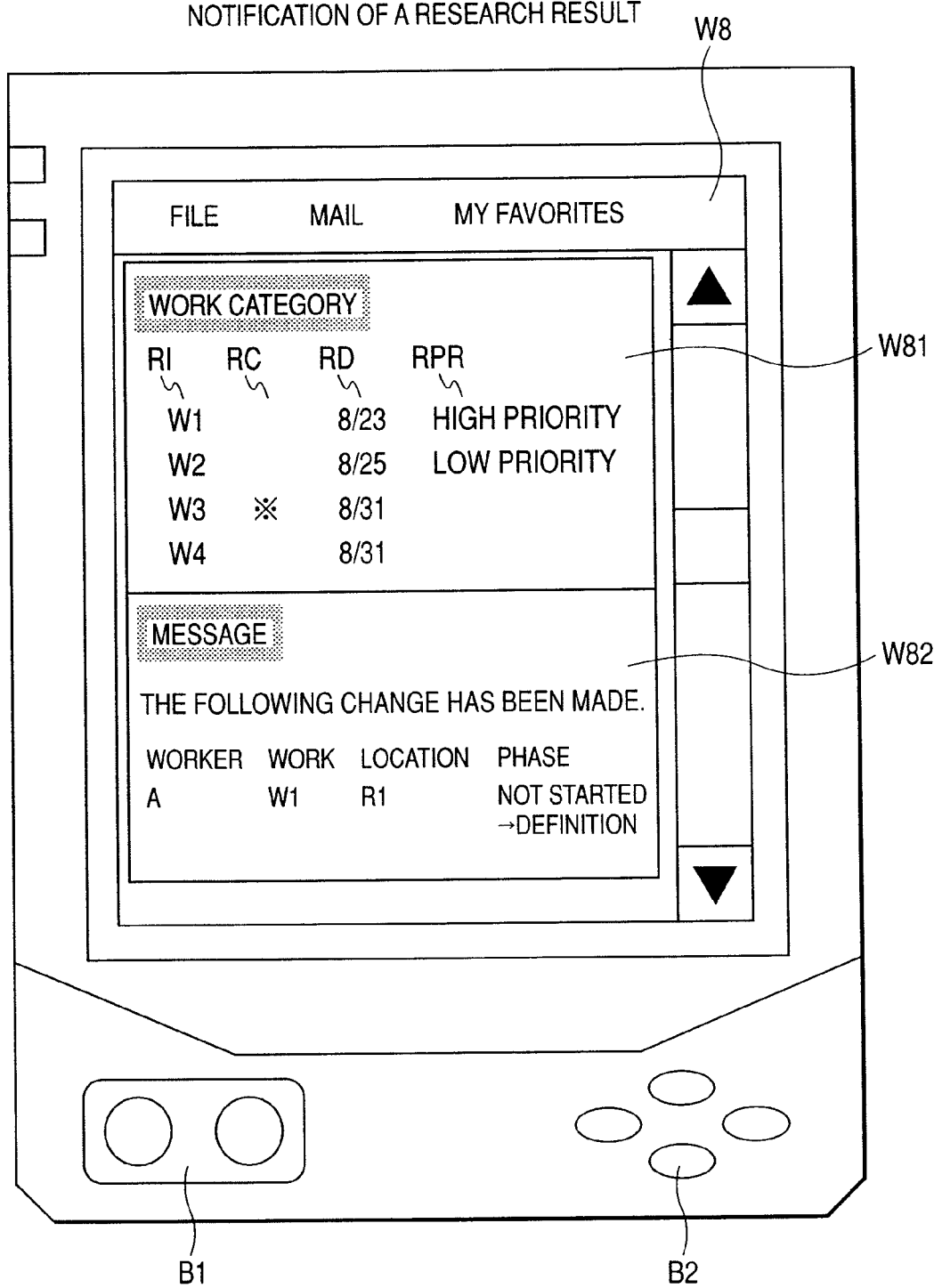
FIG. 19 shows how the sensor node in FIG. 18 shows the result according to an embodiment of the invention.

FIG. 19 shows a display example of information as a result of search and extraction which are made by the process shown in FIG. 18. The message window W82 notifies of the work to be monitored and its start and end.

Figure 20:
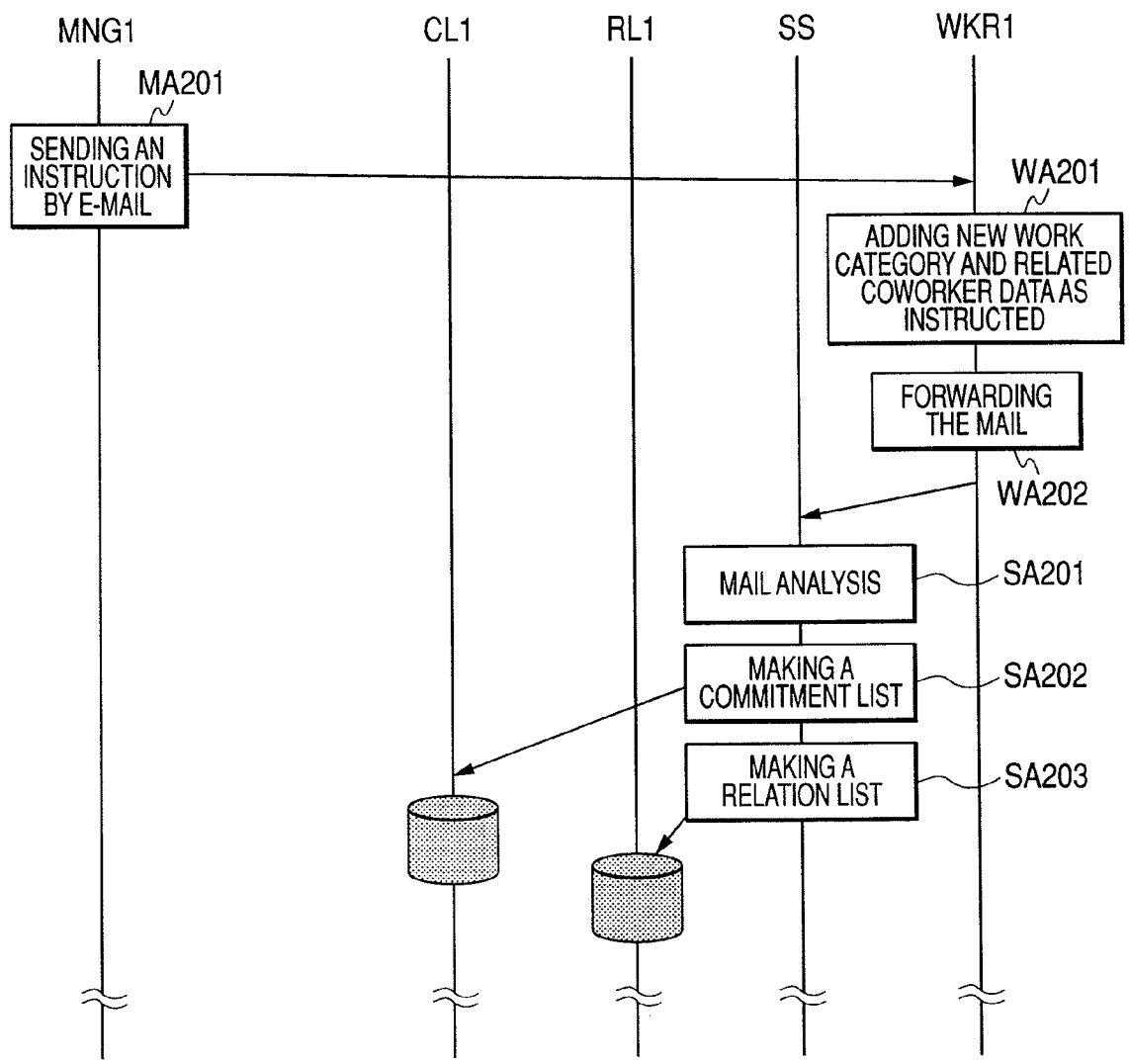
FIG. 20 shows a flow in which a commitment list is made by e-mail.
Figure 21:
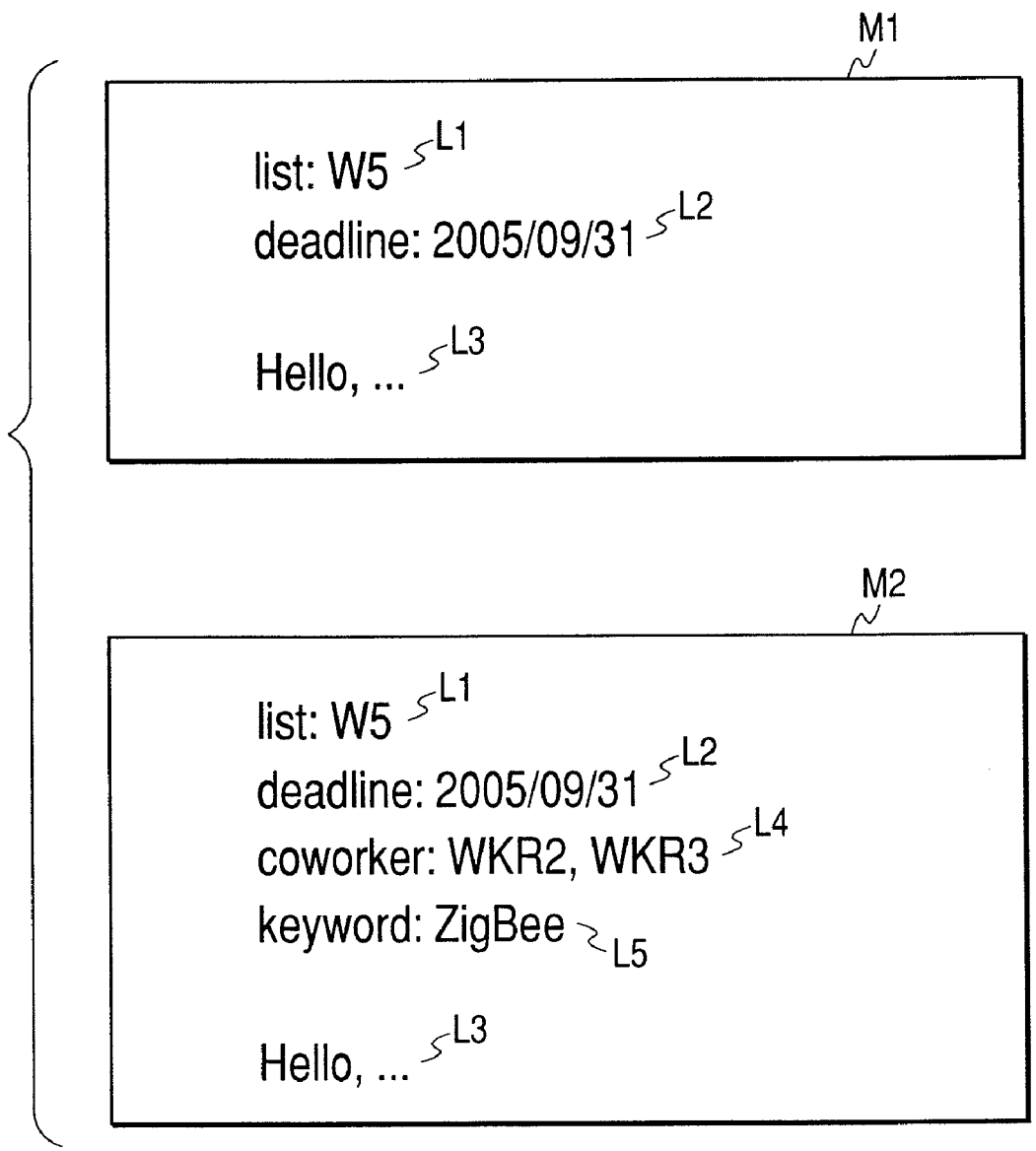
FIG. 21 shows an e-mail format used in the flow of FIG. 20 according to an embodiment of the invention.

FIGS. 20 and 21 concern a case that an instruction to make a commitment list is given and a commitment list is made using e-mails in the process as shown in FIG. 4 or a similar process. A keyword which should be included in an e-mail is predetermined and a commitment list and a relation list are made by e-mail analysis. For example, it may be a rule that a character string which follows a keyword "list:" denotes a work category or a character string which follows a keyword "deadline:" denotes a due date. Similarly, keywords assigned to rows in the commitment list and relation list and how to interpret the keywords are defined. The sensor net system SS stores a program which interprets the rules and interprets a received e-mail in accordance with the rules so that new lines are added to the commitment list or relation list of the sender of the e-mail.

This process is exemplified in FIG. 20. The manager MNG1 first sends the worker WKR1 an instruction to add a new item by e-mail (MA201). An example of this mail is shown as M1 in FIG. 21. Here, a keyword in line L1 suggests a work category and similarly due date appears in line L2. Line L3 and subsequent lines are used for body text of the mail which may be written in any format. On the other hand, the worker WKR1 which has received the mail adds other necessary information to his/her commitment list and relation list (WA201) and forwards the mail to sensor net server SS (WA202). M2 in FIG. 21 indicates the forwarded mail where line L4 for coworkers and line L5 for a related keyword are added. As a result of transmission of this mail, a new line for W5 in L1 is added to the commitment list CL1 shown in FIG. 2; and in the commitment list, "WKR1" is entered in row RW, "W5" in RI, "none" in RP and RA, "9/31" in RD, "0" (default) in RH and RHT and "Not started" (default) in RPH.

FIG. 22 shows another embodiment which visualizes a commitment list CL1. In a finishing schedule list FL1, work categories are listed in the order in which they will be finished. Also, in a starting schedule list SL1, work categories are listed in the order in which they will be started. Which work should be supported urgently or requires urgent support can be known by reference to these lists.

The finishing schedule list FL1 and the starting schedule list SL1 may be presented as follows: they may be stored as files in the server or displayed on a PC for real-time access via a Web browser or displayed on a big screen installed in a room for real-time access. If a big screen like an airport arrival/departure display board is installed so as to enable all workers to look at it, it will encourage the workers to have a common sense of purpose and a common awareness of the importance of cooperation and know the individual workers' work processes and achievements.

Figure 23:
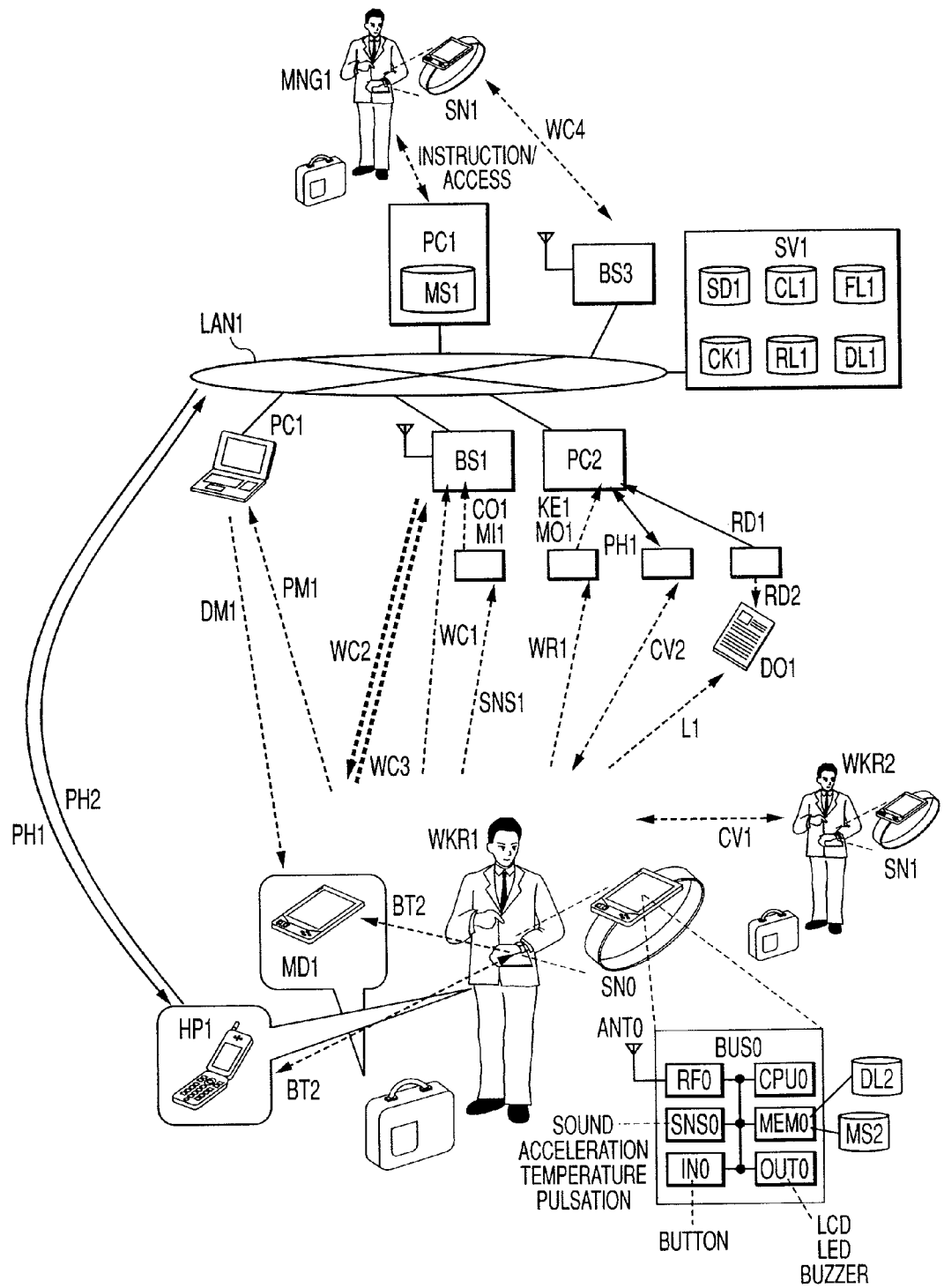
FIG. 23 shows an embodiment of the invention in which sensor node terminals which show commitment lists are used as remote controllers or viewers of various mobile terminals such as mobile phones and mobile music devices.
Figure 24:
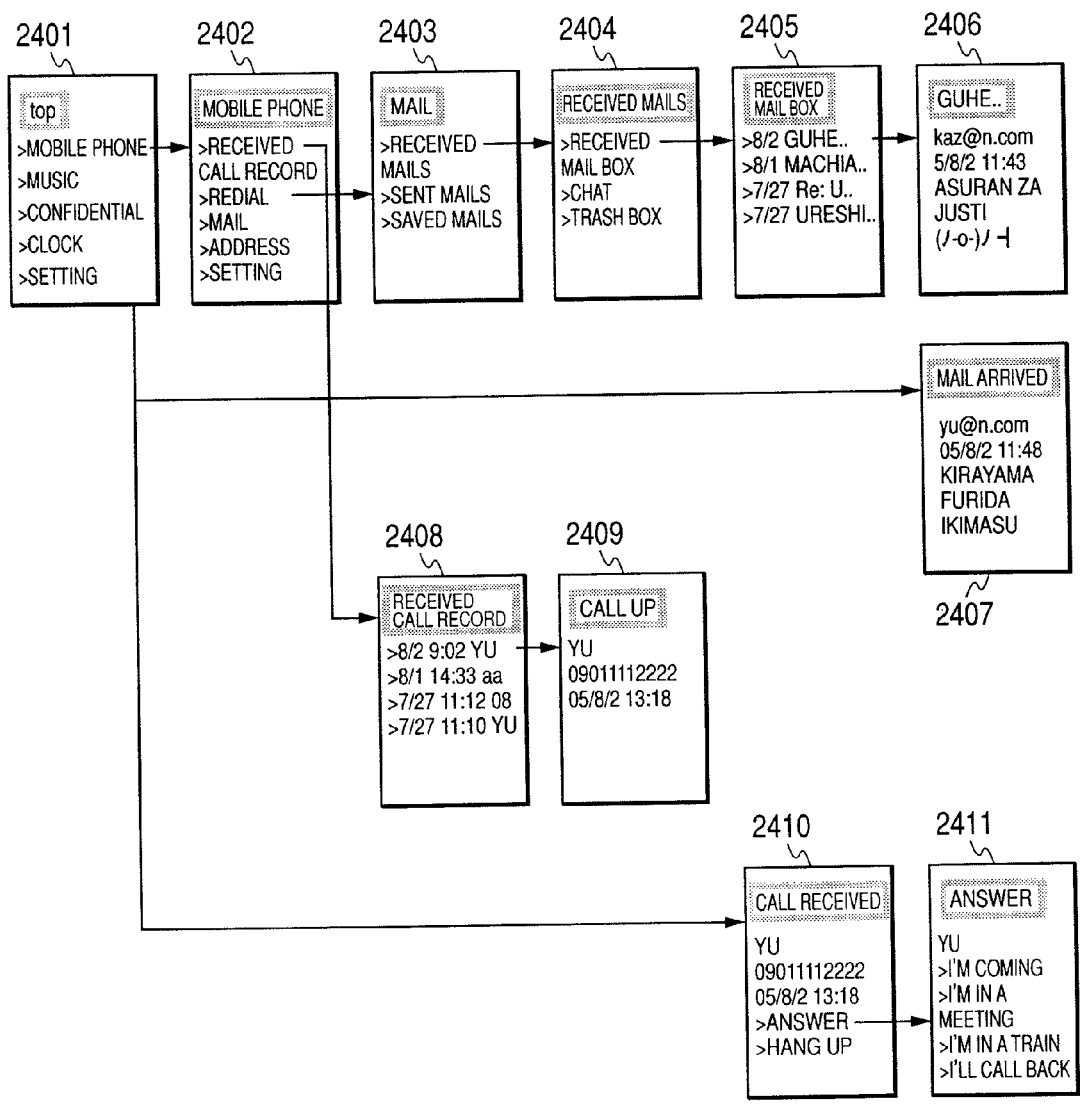
FIG. 24 illustrates e-mails, a phone call record and an answer to a received call in connection with the mobile phone shown in FIG. 23 according to an embodiment of the invention.
Figure 25:
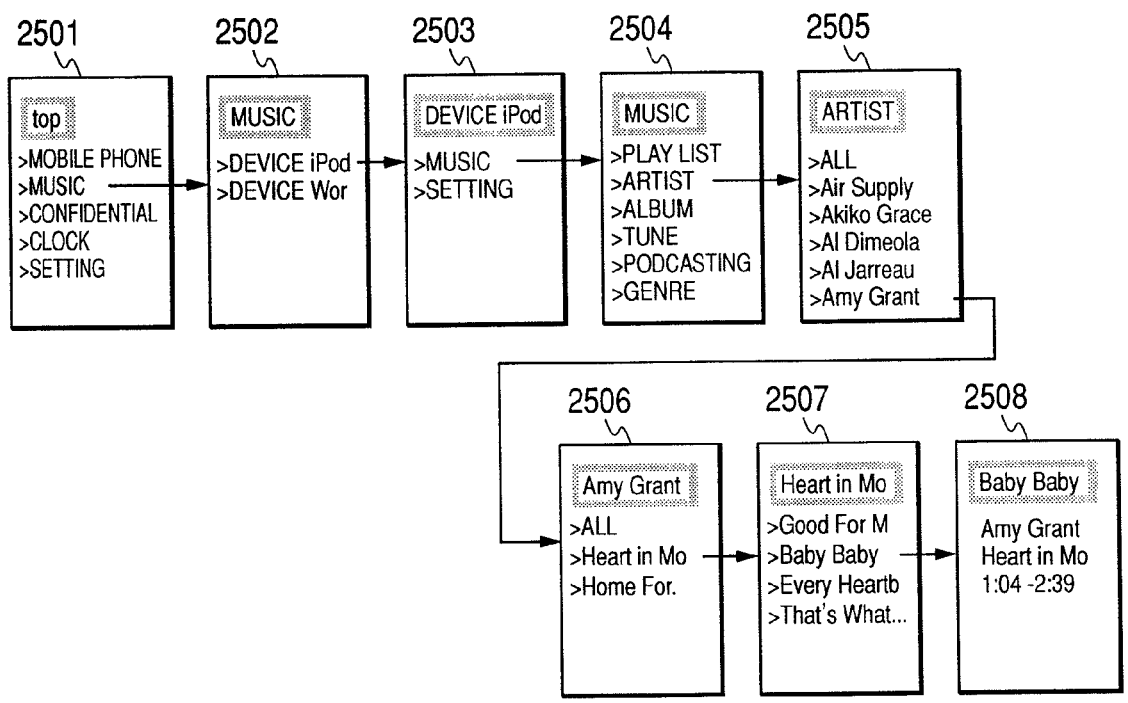
FIG. 25 illustrates displays and operation related to service which depends on the location of the wearer of a sensor node as shown in FIG. 23.
Figure 26:
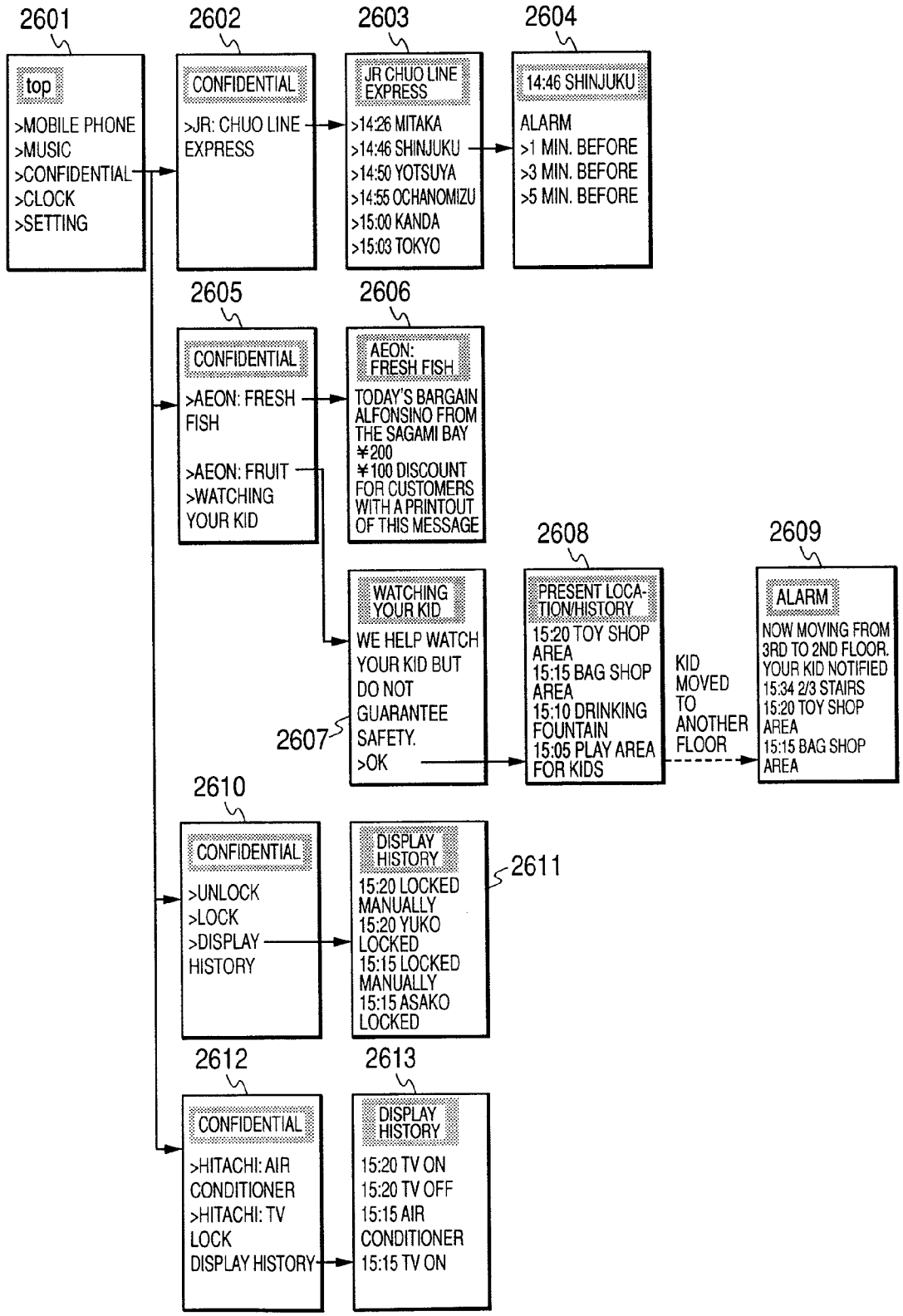
FIG. 26 illustrates clock displays and a clock design selection function as shown in FIG. 23 according to an embodiment of the invention.
Figure 27:
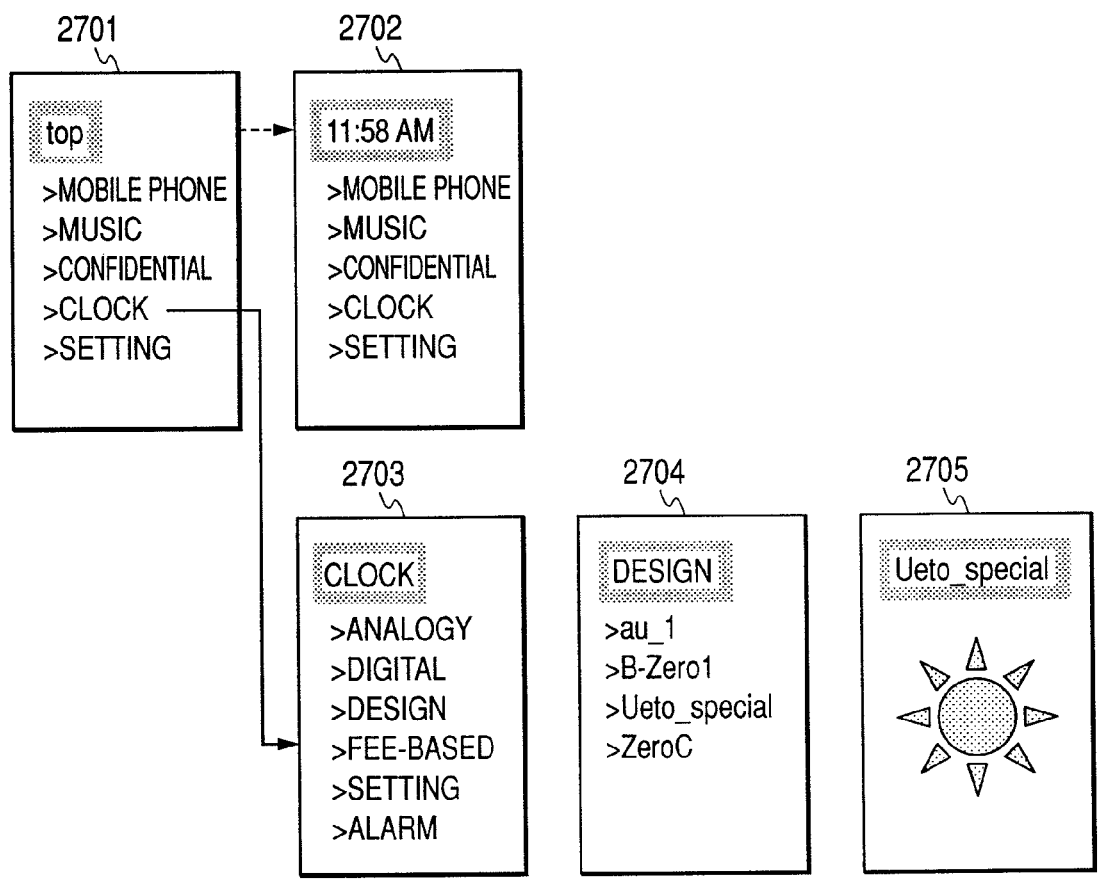
FIG. 27 illustrates service information displays concerning a commitment list, status change and contact with a person, according to an embodiment of the invention.
Figure 28:
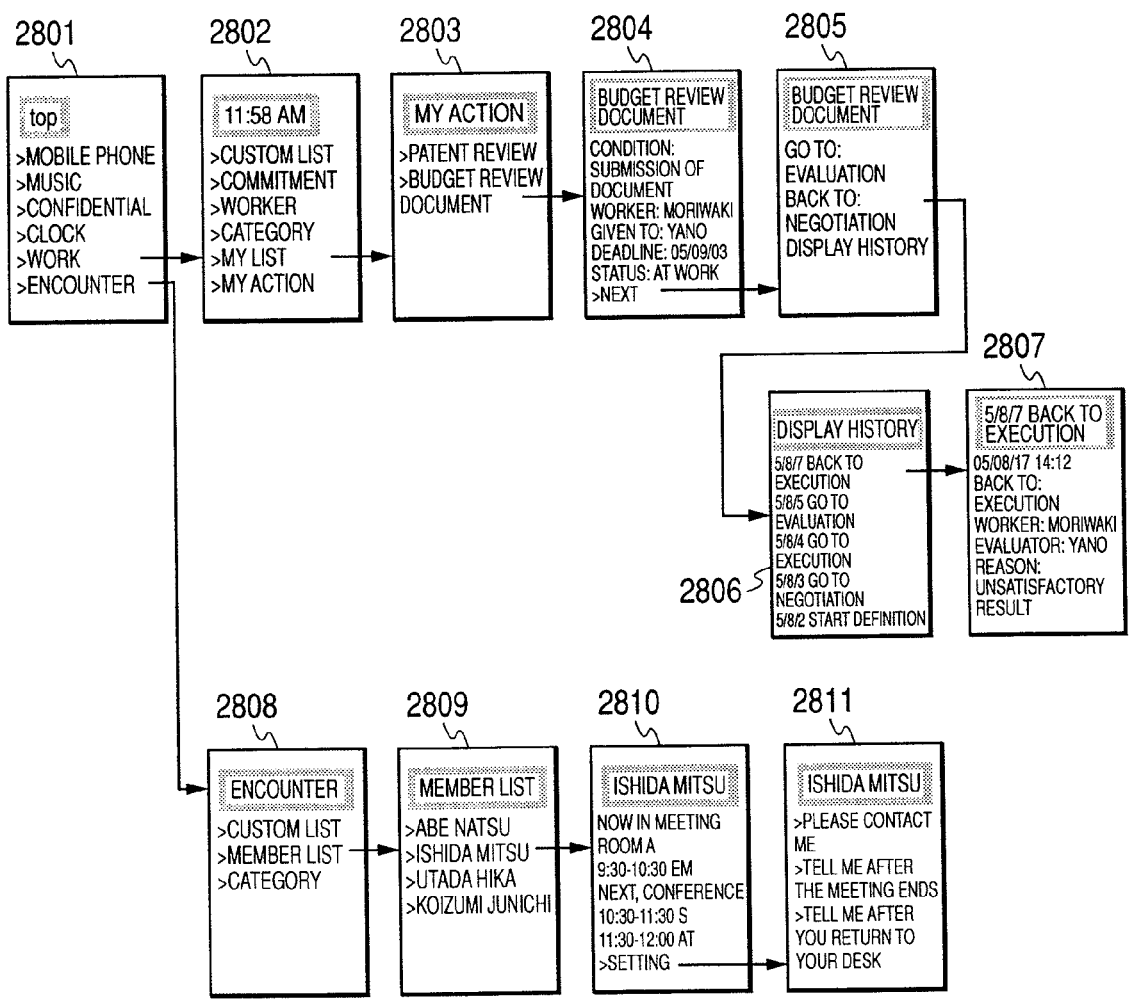
FIG. 28 illustrates e-mails, a phone call record and an answer to a received call in connection with the mobile phone shown in FIG. 23 according to an embodiment of the invention.

FIG. 23 shows an embodiment in which sensor node devices are not only used to display a commitment list but used as controllers or viewers of various mobile devices. In addition to the functions of the embodiment shown in FIG. 1, this embodiment provides other various functions. Such functions include: a function of displaying a commitment list and such information as phase change and history as illustrated in FIG. 28; an "encounter service" function with which makes it possible to select a person and get in contact with that person. In addition, when the worker WKR1's mobile phone HP1 and sensor node SN0 are equipped with a wireless module for Bluetooth short-distance radio communications, etc., transmission and reception of e-mails as illustrated in FIG. 24 are possible. It is also possible to refer to telephone call records or send an answer message upon reception of an incoming call. When the worker WKR's mobile music device is equipped with a similar wireless function, it is possible to select a piece of music or stop playback as illustrated in FIG. 25. Furthermore, it is also possible to identify in which environment the worker WKR1 is now, from the base station device with which the sensor node SN0 of the worker WKR1 is communicating. This function can be used to provide a special service dedicated to the environment as illustrated in FIG. 26. The timer function of the CPU module CPU0 of the sensor node SN0 can be used to display a clock on the sensor node SN0. Particularly when an LCD screen is used, a display design can be selected from among many design options.

FIG. 28 shows an embodiment concerning the display and operation for a commitment list and the display and operation for "encounter service." In the figure, 2801 to 2811 represent LCD screens at a certain time. 2801 shows a screen which appears just after start, indicating an inactive status where the worker can choose a function. As the worker selects the option "Work," the screen changes to screen 2802. On the screen 2802, the worker can choose one form various options including "Worker," "Commitment list," and "Category." If the worker chooses "My action," work categories for which the worker is responsible appear on screen 2803, for example, in the order of deadline urgency in the commitment list. As the worker chooses a work category there, details of the work category appear on screen 2804. The work phase for the work category can be changed on the next screen 2805. If the worker chooses the option "Display history" there, a history screen 2806 appears. Then, as the worker chooses a desired option there, related information such as the date of execution, worker in charge, evaluator, and evaluator's comment appears on screen 2807.

If the worker has chosen the option "Encounter" on the screen 2801, a screen for options concerning how to choose the person to be contacted appears like screen 2808. If the worker chooses the option "Member list" there, a list of persons which the worker can contact appears. The list can be based on the commitment list. After selection of the person to be contacted, the current location of that person as extracted from the sensor net system SS and the person's schedule as extracted from a relevant schedule list are shown like screen 2810. As the worker chooses an option, a screen for selection of the contact method appears like screen 2811. If the worker chooses the option "Please contact me," an e-mail may be sent to the person and a message can be sent to the person's sensor node to show the message there.

According to the present invention, in a business group, it is easy to grasp in real time what kind of work each worker is engaged in and also a manager's policy and an instruction about priority can be sent to workers in real time and a worker can easily access another worker skilled in the work in which he/she is now engaged.

What is claimed is:

1. A sensor net system comprising:
    a plurality of sensor nodes, where each sensor node is held on a person of a differing worker, and each sensor node includes;
        a sensor which obtains sensor data of a worker;
        a radio frequency circuit which notifies a server of the sensor data; and
    a server which includes:
        a unit for storing a relation list for correlating the sensor data with a work category of the worker;
        a unit for confirming a coworker who works together with the worker based on a plurality of obtained sensor data; and
        a unit for confirming a work category in which the worker and the coworker are engaged based on the confirmed coworker and the relation list.

2. The sensor net system as claimed in claim 1, wherein confirmed work categories for the worker are graphically shown in chronological order on a display unit connected to the server.

3. The sensor net system as claimed in claim 1, wherein a location where the worker and coworker are engaged in the work category, is displayed on a display unit connected to the server.

4. The sensor net system as claimed in claim 1, wherein work barometer when the worker is engaged in the work category is displayed on a display unit connected to the server.

5. The sensor net system as claimed in claim 4, wherein the work barometer is a degree of activity or a speech frequency.

6. The sensor net system as claimed in claim 1, wherein the server further has a unit for storing an interest list for storing a keyword related to the each of workers in a correlative manner, and
if a keyword extracted in relation to the worker coincides with the keyword correlated with the coworker included in the interest list, the server notifies the worker of information on the coworker.

7. The sensor net system as claimed in claim 1, wherein the server further has a unit for storing an interest list for storing a keyword related to the each of workers in a correlative manner, and
if a keyword extracted in relation to the worker coincides with the keyword correlated with the coworker included in the interest list, the server notifies the coworker of information on the worker.

8. A sensor net system comprising:
    a plurality of sensor nodes, where each sensor node is held on a person of a differing worker, and each sensor node includes:
        a sensor which obtains sensor data of a worker on whom it is held; and
        a radio frequency circuit which notifies a server of the sensor data; and
    a server which includes:
        a unit for storing a relation list for correlating the sensor data with a work category of the worker;
        a unit for confirming another worker who is working near the worker, based on a plurality of sensor data;
        a unit for confirming a work category in which the worker and the another worker are engaged, based on the confirmed another worker and the relation list.

9. The sensor net system as claimed in claim 8, wherein a location where the worker and the another worker are engaged in the work category, is displayed on a display unit connected to the server.

10. The sensor net system as claimed in claim 8, wherein a degree of activity or a speech frequency of the worker is displayed on a display unit connected to the server.

* * * * *